United States Patent
Rajaraman et al.

(10) Patent No.: US 12,394,981 B2
(45) Date of Patent: Aug. 19, 2025

(54) BUILDING CONTROL SYSTEM WITH INTELLIGENT LOAD SHEDDING

(71) Applicant: Tyco Fire & Security GmbH, Neuhausen am Rheinfall (CH)

(72) Inventors: Rupak Rajaraman, Palakkad (IN); Dhanraj Vikas Katkar, Mumbai (IN); Kiruthika Vijayan, Chennai (IN); Tushar Subhash Jadhav, Ghorpad (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 368 days.

(21) Appl. No.: 18/105,090

(22) Filed: Feb. 2, 2023

(65) Prior Publication Data

US 2024/0266831 A1    Aug. 8, 2024

(51) Int. Cl.
H02J 3/14    (2006.01)
H02J 3/00    (2006.01)

(52) U.S. Cl.
CPC .............. H02J 3/144 (2020.01); H02J 3/003 (2020.01)

(58) Field of Classification Search
CPC ................................. H02J 3/144; H02J 3/003
USPC ......................................................... 700/295
See application file for complete search history.

(56) References Cited

U.S. PATENT DOCUMENTS

| | | |
|---|---|---|
| 10,706,375 B2 | 7/2020 | Wenzel et al. |
| 11,274,849 B2 | 3/2022 | Bell et al. |
| 2012/0078432 A1* | 3/2012 | Weatherhead ......... G06Q 10/06 700/295 |
| 2015/0316907 A1 | 11/2015 | Elbsat et al. |
| 2017/0212488 A1 | 7/2017 | Kummer et al. |
| 2018/0340702 A9 | 11/2018 | Turney et al. |
| 2019/0109457 A1* | 4/2019 | Flatau ...................... H02J 3/14 |
| 2021/0132586 A1 | 5/2021 | Wenzel et al. |
| 2021/0200164 A1 | 7/2021 | Ploegert et al. |
| 2021/0200165 A1 | 7/2021 | Ploegert et al. |
| 2021/0200169 A1 | 7/2021 | Ploegert et al. |
| 2021/0200170 A1 | 7/2021 | Ploegert et al. |
| 2021/0200173 A1 | 7/2021 | Ploegert et al. |
| 2021/0200764 A1 | 7/2021 | Ploegert et al. |
| 2021/0200792 A1 | 7/2021 | Ploegert et al. |
| 2021/0200807 A1 | 7/2021 | Ploegert et al. |
| 2021/0200912 A1 | 7/2021 | Ploegert et al. |
| 2021/0216052 A1 | 7/2021 | Ploegert et al. |
| 2022/0100918 A1 | 3/2022 | Ploegert et al. |
| 2022/0224114 A1* | 7/2022 | McKeever .............. H02J 3/381 |

(Continued)

OTHER PUBLICATIONS

U.S. Appl. No. 17/737,873, filed May 5, 2022, Johnson Controls Tyco IP Holdings LLP.

*Primary Examiner* — Jigneshkumar C Patel
(74) *Attorney, Agent, or Firm* — Foley & Lardner LLP

(57) ABSTRACT

A method includes determining a probability that load shedding will be needed to achieve a target energy consumption. The method also includes, in response to the probability exceeding a threshold, generating a plurality of scores for a plurality of units of equipment indicating relative advantages of shedding the plurality of units of the equipment and implementing the load shedding by controlling plurality of unit of equipment. Controlling the plurality of units of equipment includes shedding a first unit of the plurality of units. The first unit is associated with an extremum score of the plurality of scores.

20 Claims, 16 Drawing Sheets

(56) References Cited

U.S. PATENT DOCUMENTS

2022/0405327 A1    12/2022    Swanson et al.
2023/0020417 A1    1/2023    Elbsat et al.

* cited by examiner

BUILDING CONTROL SYSTEM WITH INTELLIGENT LOAD SHEDDING

BACKGROUND

The present disclosure relates generally to a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. In some scenarios, a BMS is associated with a source of green energy, such as a photovoltaic energy system, that provides energy to other equipment and devices associated with the BMS.

SUMMARY

One implementation of the present disclosure is a method for controlling building equipment to achieve a target energy consumption. The method includes determining a probability that load shedding will be needed to achieve the target energy consumption during a future time period, in response to the probability exceeding a threshold, generating a plurality of scores for a plurality of units of equipment using one or more machine learning models trained on historical data from a historical time period, the plurality of scores indicating relative load shedding priorities associated with the plurality of units of the equipment during the future time period, and implementing the load shedding by controlling the plurality of units of equipment in accordance with the plurality of scores during the future time period. Controlling the plurality of units of equipment comprises shedding a first unit of the plurality of units, the first unit associated with an extremum score of the plurality of scores.

In some embodiments, the method also includes shedding a second unit of the plurality of units in response to determining that shedding the first unit is insufficient to achieve the target energy consumption. Shedding the first unit can include turning off the first unit. Shedding the first unit can include changing a setting for the first unit.

In some embodiments, generating the plurality of scores includes using a plurality of machine learning models associated with the plurality of units of the equipment. The plurality of machine learning models can include a first machine learning model for the first unit of the plurality of units, using the plurality of machine learning models can include providing, as inputs to the first machine learning model, a first value of a first building condition associated with the first unit and a second value of a second building condition associated with a second unit of the plurality of units, with the first building condition being correlated with the second building condition.

In some embodiments, the method includes controlling the equipment to provide load shifting in response to predicting that the load shedding is insufficient to achieve the target energy consumption. In some embodiments, the target energy consumption includes a plurality of energy amounts associated with a plurality of time steps in a time period. In some embodiments, the method includes generating the target energy consumption based on a net energy goal and a forecast amount of energy generation. The method can include generating the net energy goal as an output of a control process configured to drive cumulative net energy over a time period to a value of zero or higher, wherein the net energy goal is for a subperiod of the time period.

Another implementation includes one or more non-transitory computer-readable media storing program instructions that, when executed by one or more processors, cause the one or more processors to perform operations. The operations include determining a probability that load shedding will be needed during a future time period to achieve a target energy consumption during the future time period, in response to the probability exceeding a threshold, generating a plurality of scores for a plurality of units of equipment using one or more machine learning models trained on historical data from a historical time period, the plurality of scores indicating relative load shedding priorities associated with the plurality of units of the equipment during the future time period, and implementing the load shedding by controlling the plurality of units of equipment during the future time period in accordance with the plurality of scores. Controlling the plurality of units of equipment comprises shedding a first unit of the plurality of units, the first unit associated with an extremum score of the plurality of scores.

In some embodiments, operations also include shedding a second unit of the plurality of units in response to determining that shedding the first unit is insufficient to achieve the target energy consumption. Shedding the first unit comprises can include turning off the first unit or changing a setting for the first unit.

In some embodiments, generating the plurality of scores includes using a plurality of machine learning models associated with the plurality of units of the equipment. In some embodiments, the plurality of machine learning models include a first machine learning model for the first unit of the plurality of units, using the plurality of machine learning models includes providing, as inputs to the first machine learning model, a first value of a first building condition associated with the first unit and a second value of a second building condition associated with a second unit of the plurality of units, and the first building condition is correlated with the second building condition.

In some embodiments, the operations also include controlling the equipment to provide load shifting in response to predicting that the load shedding is insufficient to achieve the target energy consumption. In some embodiments, the target energy consumption includes a plurality of energy amounts associated with a plurality of time steps in a time period. In some embodiments, the operations also include generating the target energy consumption based on a net energy goal and a forecast amount of energy generation. In some embodiments, the operations also include generating the net energy goal as an output of a control process configured to drive cumulative net energy over a time period to a value of zero or higher. The net energy goal is for a subperiod of the time period.

Another implementation of the present disclosure is a system include a plurality of units of building equipment serving a facility and a controller. The controller is programmed to determine a probability that load shedding will be needed to achieve a target energy consumption for the facility, generating a plurality of scores for the plurality of units of equipment indicating relative advantages of shedding the plurality of units of the equipment in response to the probability exceeding a threshold; and implementing the load shedding by shedding a first unit of the plurality of units in response to the first unit being associated with a maximum score of the plurality of scores.

DETAILED DESCRIPTION

Overview

Referring generally to the FIGURES, net zero energy facilities and systems, devices, and methods relating thereto are shown in various embodiments. The innovations herein are related to providing a facility (building, campus, etc.) that consumes a net total of zero energy (or lower) over a time period (e.g., over a year, over a quarter, over a month, etc.). Consumption of net zero total energy can be advantageous for environmental reasons (e.g., to reduce carbon emission and other pollution) and for complying with associated regulations and responding to various stakeholders. In some aspects, the innovations herein provide technical solutions to problems associated with climate change and environmental constraints on future facilities projects.

A net zero energy facility is a facility which uses no more energy than the facility produces over a time period. Such a facility can include on-site energy sources, for example green energy sources such as a photovoltaic system for collecting solar energy, one or more windmills for collecting wind energy, a geothermal energy system for converting geothermal activity into electricity, etc. Such green energy sources may be non-carbon-emitting, non-polluting, renewable, etc. and can be installed at a facility. Energy from such sources can be used by various energy loads of the facility, including HVAC devices, lighting devices, appliances, computing equipment (e.g., data center), etc. Net energy is the difference between the energy production from the facility's energy sources and the facilities energy loads.

The facility may be connected to an energy grid which provides energy to the facility or receives energy from the facility to account for any excess energy or demand at a given time, for example when energy production and consumption are asynchronous. However, even where grid energy is used by the facility, energy can be provided back to the grid and a technical goal may exist to achieve net zero consumption from the grid over a time period. In such scenarios, a facility manager may be able to report net zero energy over a time period even where grid energy is used at certain times (e.g., at times of low renewable energy production). However, a challenge exists in optimally controlling the facility to adapt to changing conditions in order to achieve net zero energy status over a desired time period. The innovations detailed below address such challenges.

Building HVAC Systems and Building Management Systems

Figure 1:
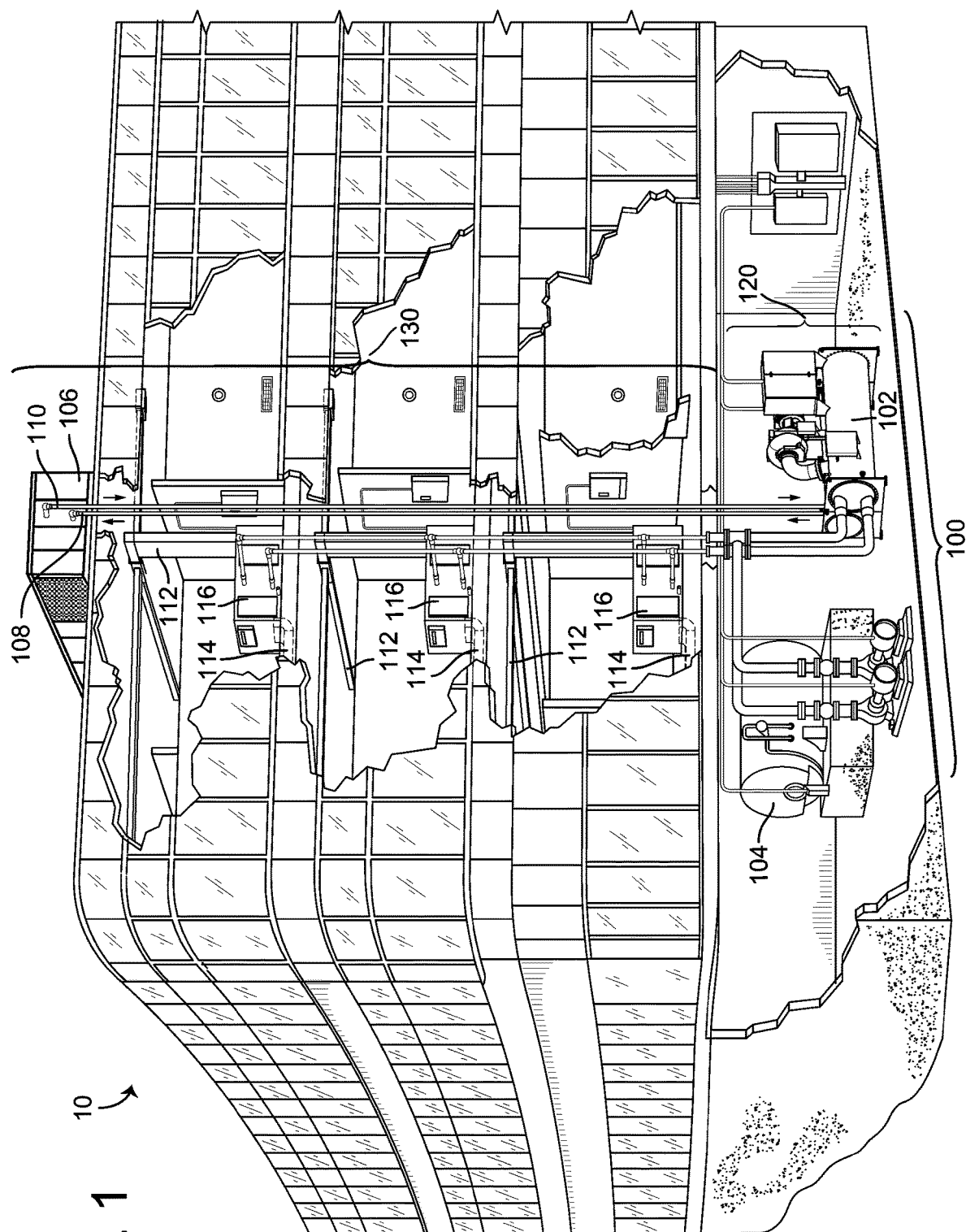
FIG. 1 is a drawing of a building equipped with a HVAC system, according to some embodiments.
Figure 2:
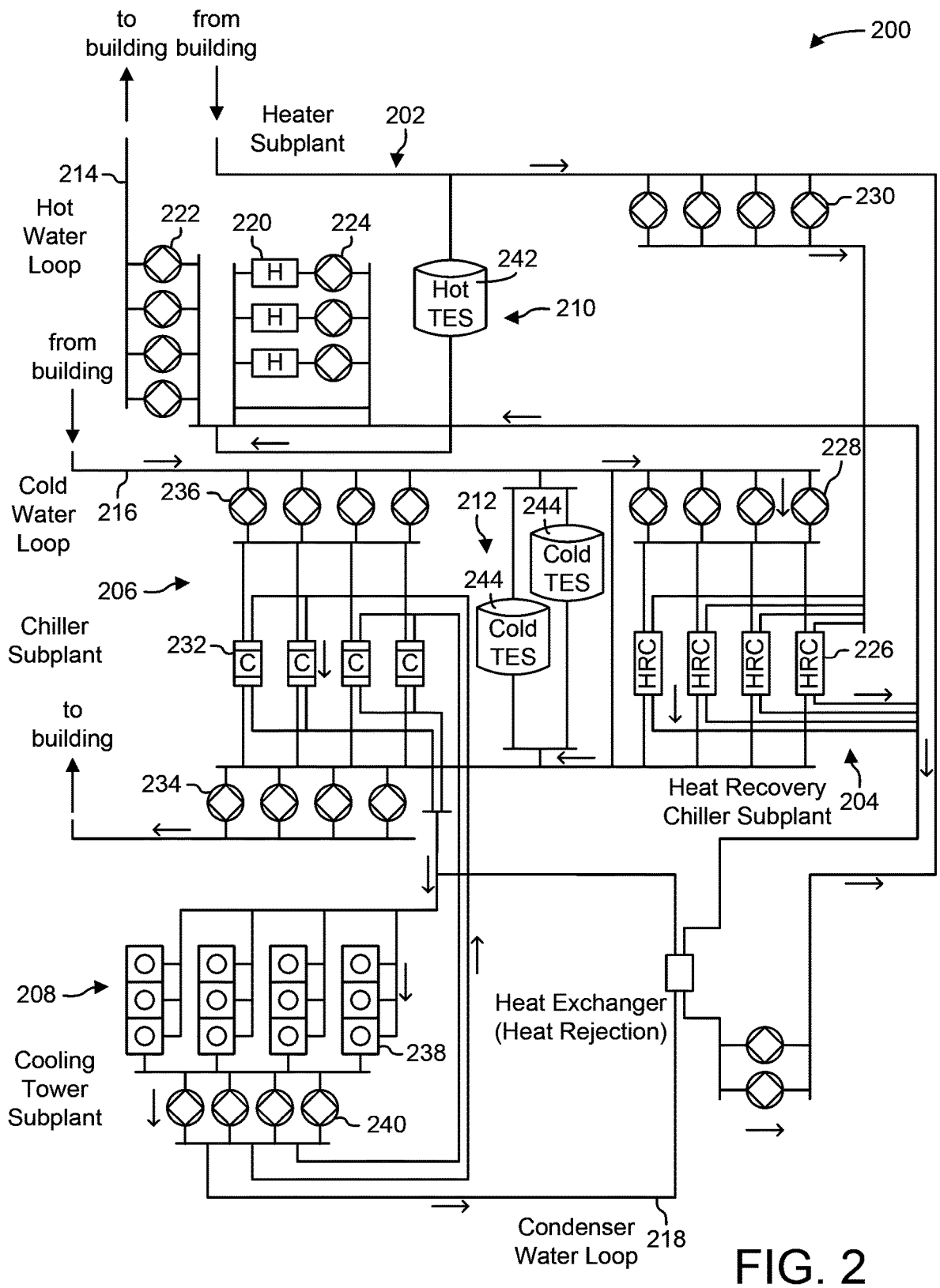
FIG. 2 is a block diagram of a waterside system which can be used to serve the building of FIG. 1, according to some embodiments.
Figure 3:
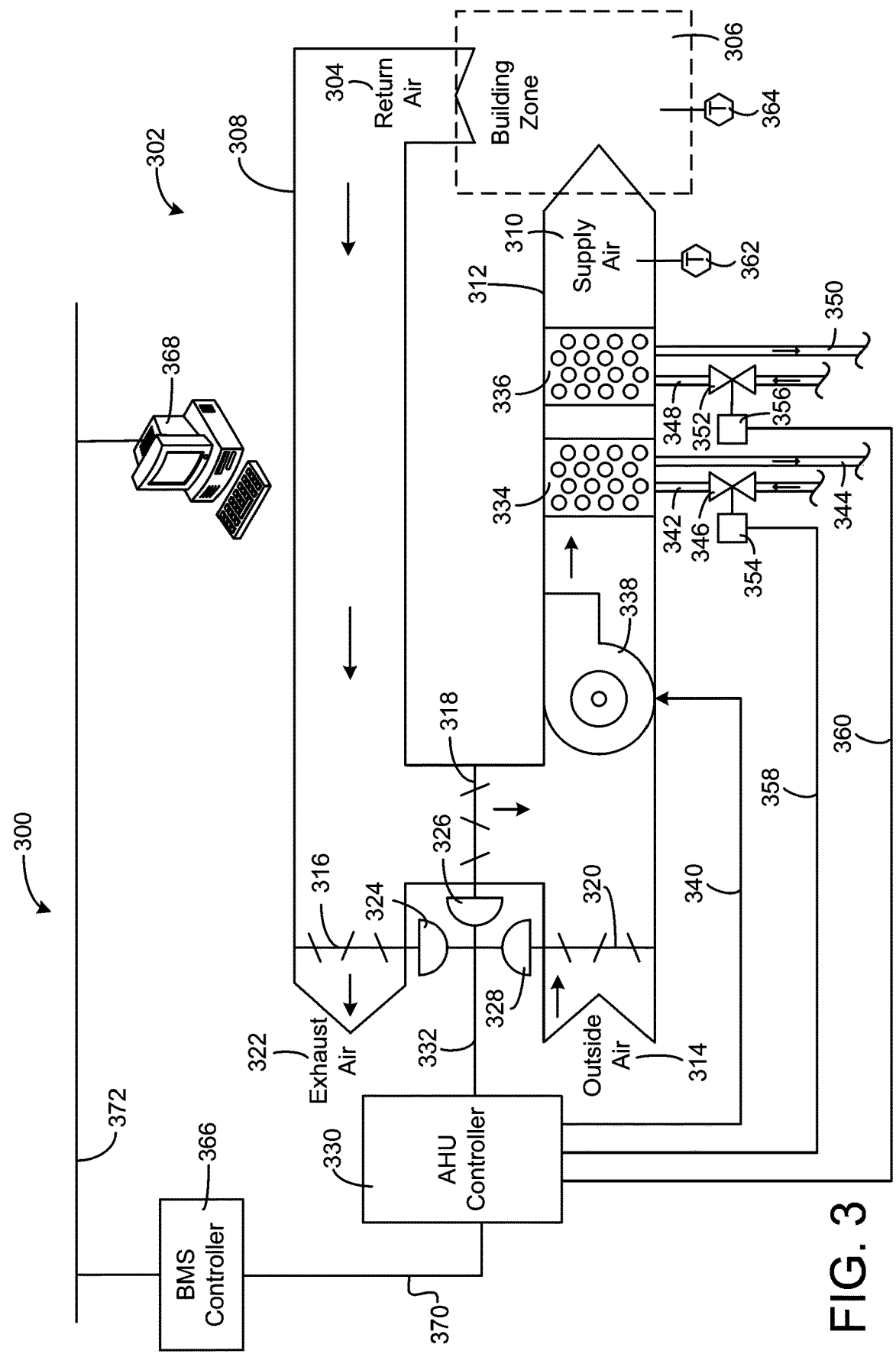
FIG. 3 is a block diagram of an airside system which can be used to serve the building of FIG. 1, according to some embodiments.
Figure 4:
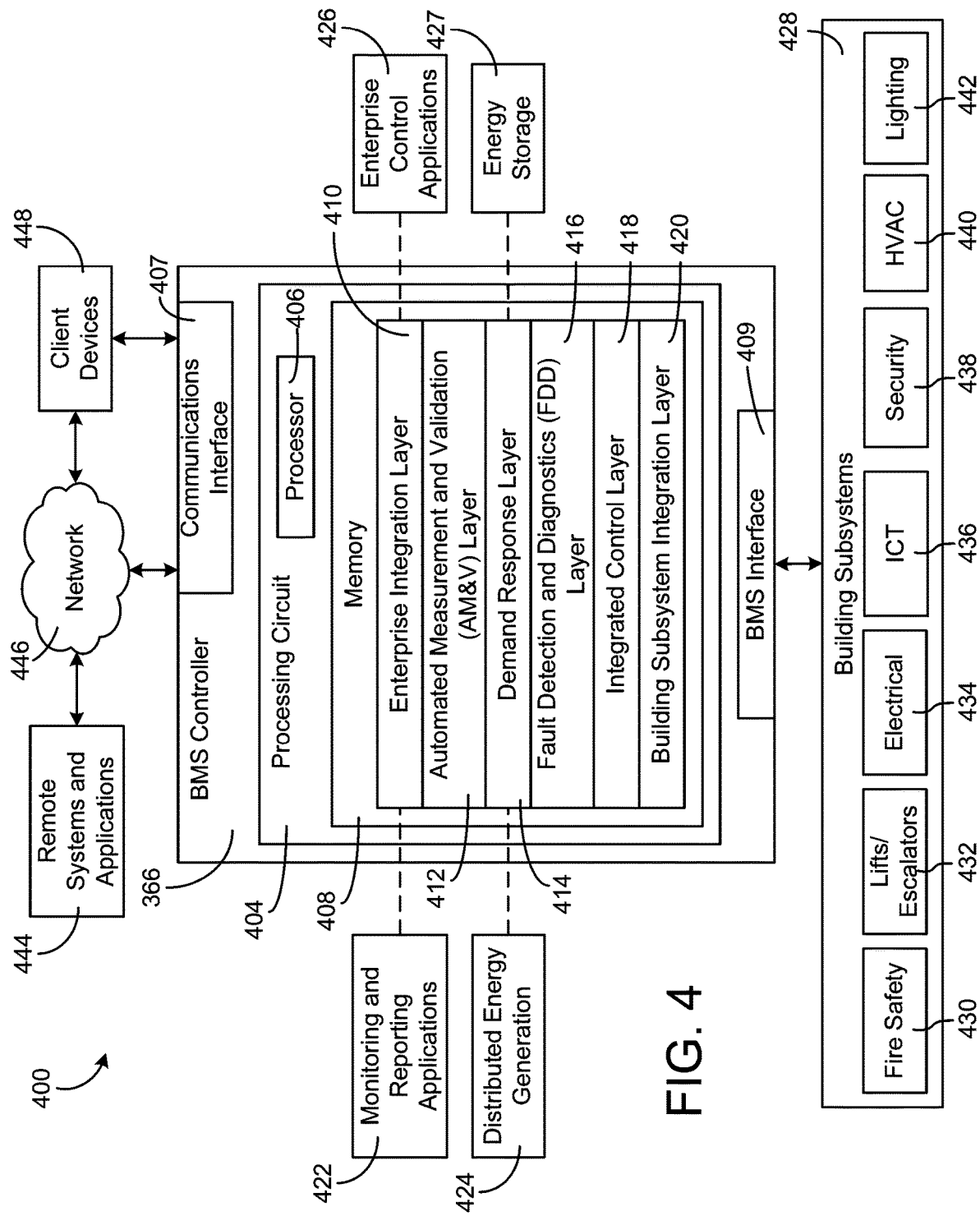
FIG. 4 is a block diagram of a building management system (BMS) which can be used to monitor and control the building of FIG. 1, according to some embodiments.
Figure 5:
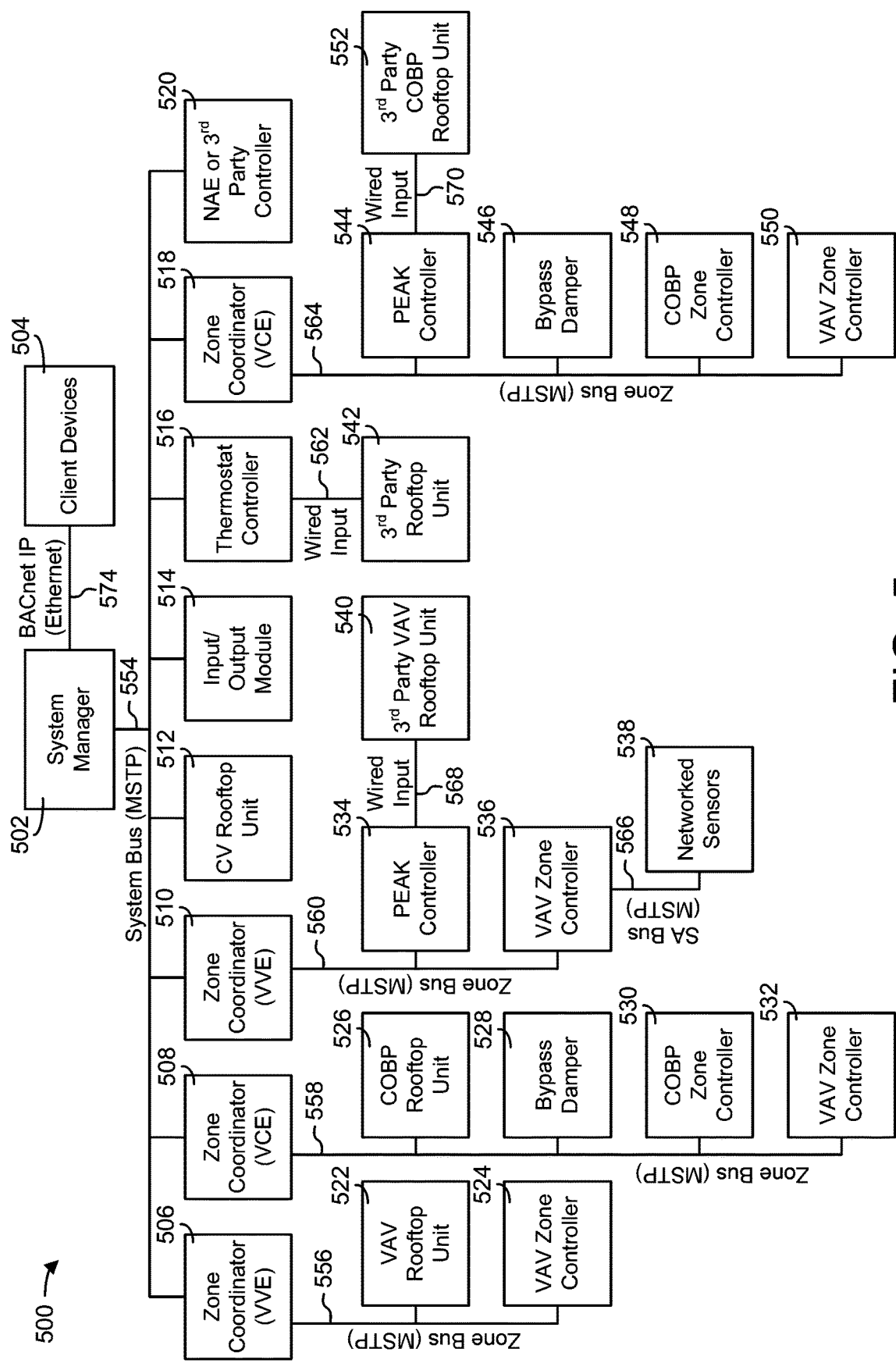
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein. One or more non-transitory computer readable media can store instructions that when executed by one or more processors perform the operations disclosed herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Net Zero Energy Facilities

Figure 6:
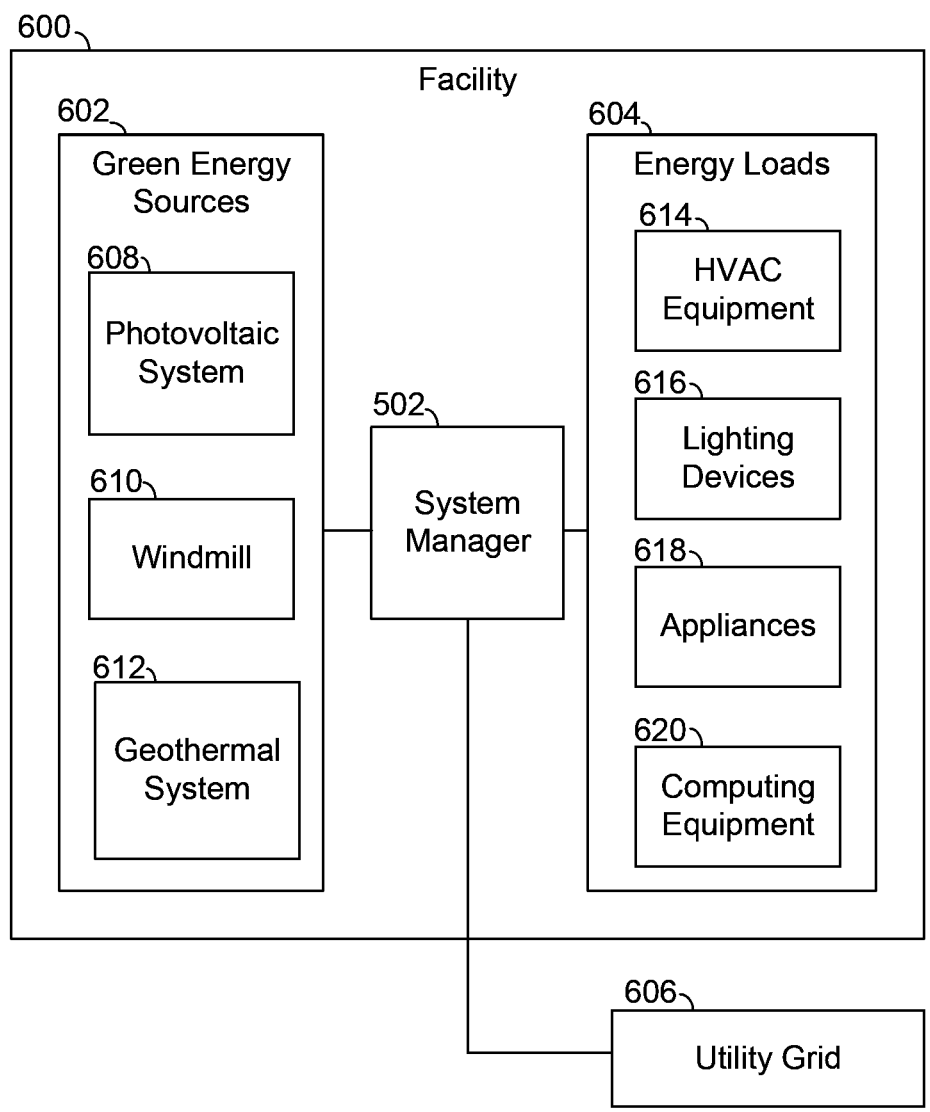
FIG. 6 is a block diagram of a net zero energy facility, according to some embodiments.

Referring now to FIG. 6, a block diagram of a net zero energy facility 600 is shown, according to some embodiments. The facility 600 may be a building (e.g., building 10, residential building, commercial building, healthcare facility, school, etc.), collection of buildings, campus, outdoors facility (e.g., park, railyard, port, sports facility, etc.), or other location in various embodiments. The facility 600 is shown as including the system manager 502, green energy sources 602, and energy loads 604, with the facility 600 also shown as being connected to utility grid 606.

The green energy sources 602 are shown as including a photovoltaic system 608, a windmill 610, and a geothermal system 612. The green energy sources 602 are shown as being located at the facility 600. For example, the photovoltaic system 608 and/or the windmill 610 may be positioned on a rooftop. As another example, the photovoltaic system 608 can be positioned adjacent to a building or other structure. The photovoltaic system 608 can include photovoltaic cells configured to transform solar irradiance into electricity. The windmill 610 can include a turbine configured to convert wind at the facility 600 into electricity. The geothermal system 612 can be configured to transform geothermal energy (e.g., geothermal heat from below ground) into electricity and/or directly use geothermal heat for heating a building or serving other building demands. Depending access of the facility 600 to various resources and geological features, various types of green energy sources 602 can be included in various embodiments (e.g., hydro-electric power, etc.). In some embodiments, the green energy sources 602 include energy storage devices (e.g., batteries) which enable delay between a time of energy production/harvesting and energy usage.

The energy loads 604 are shown as including HVAC equipment 614, lighting devices 616, appliances 618, and computing equipment 620. The HVAC equipment 614 can include equipment of a waterside system 200 and an airside system 300 as described above for example. The HVAC equipment 614 can include a variable refrigerant flow system, a room air conditioner, a window air conditioner, etc. in various embodiments. The lighting devices 616 are configured to illuminate the facility 600 and can include various light fixtures, bulbs, arrays, etc., including indoor and outdoor lighting. The appliances 618 can include various miscellaneous appliances which consume energy at the facility 600 and may vary in various scenarios and use cases for the facility (e.g., ovens, stoves, microwaves, dishwashers, water heaters, laboratory equipment, medical devices, manufacturing line equipment, electrified vehicle charging stations, etc.). The computing equipment 620 can include personal computing devices (e.g., desktop computers, laptop computers, etc.) and/or servers, networking infrastructure, data center, etc. Various energy loads 604 can be included at the facility 600.

The system manager 502 is configured to perform operations as described below with reference to FIGS. 7-11 in order to cause the energy loads 604 to operate to consume the same amount of energy as produced by the green energy sources 602 over a time period (e.g., over a month, over a quarter, over a year). For particular subperiods of the time period, energy production by the green energy sources 602 may be greater than or less than energy consumption by the energy loads 604 (e.g., due to fluctuations in availability of renewable energy, spikes in energy demand, etc.) with the grid 606 absorbing excess production and serving excess demand. The system manager 502 operates over the time period to balance such subperiods such that energy production by the green energy sources 602 and energy consumption by the energy loads 604 are equalized by the end of the time period. When such operations are successfully executed, the facility 600 can be characterized as a net zero energy facility. In some embodiments, the energy consumption by the energy loads 604 is less than the energy production by the green energy sources 602 over the time period, in which case the facility 600 produces more energy than it consumes. Such operation may also cause the facility 600 to be characterized as a net zero energy facility (i.e., energy consumption by the facility 600 is less than or equal to energy consumption by the facility 600 over a given time period).

Figure 7:
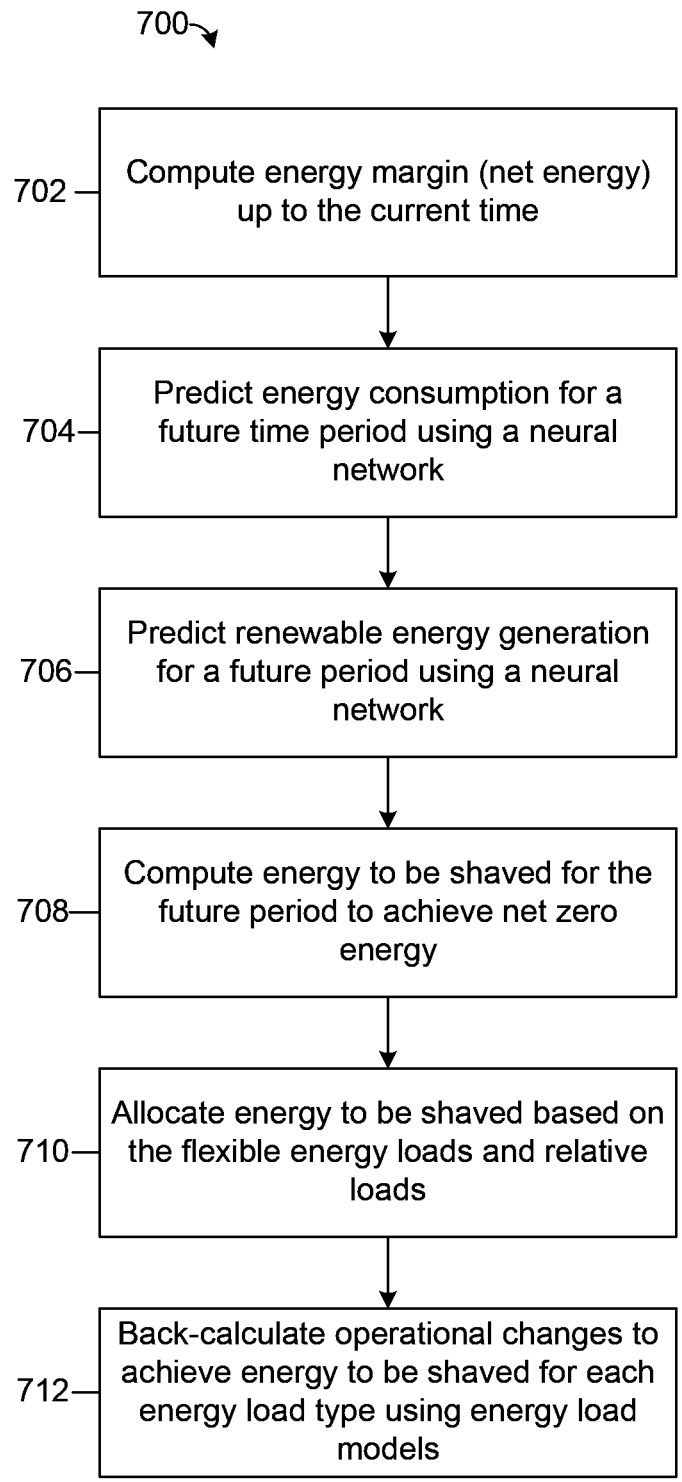
FIG. 7 is a flowchart of a process of achieving net zero energy, according to some embodiments.

Referring now to FIG. 7, a flowchart of a process 700 for achieving net zero energy consumption over a time period is shown, according to some embodiments. The process 700 can be executed by the facility 600, for example by the system manager 502. In some embodiments, the process 700 is executed prior to a time period over which net zero energy consumption is to be achieved, or at the beginning of the time period. In other embodiments, the process 700 can be executed partially into the time period such that some amount of energy consumption and/or energy production by the facility 600 has already occurred within the time period up to the point in time at which the process 700 is executed.

At step 702, the energy margin for the facility 600 (i.e., a difference between energy production and energy consumption by the facility 600) up to a current time is calculated. The energy margin may be defined as the total amount of energy produced by the facility 600 within the time period up to the current time minus the total amount of energy consumed by the facility 600 within the time period up to the current time. The energy margin may be calculated based on data from energy meters that measure energy production and consumption at the facility 600, for example. The energy margin can be calculated from a designated starting point (e.g., the beginning of a month, the beginning of a quarter, a beginning of a fiscal year or calendar year, etc.) up to the current time at which the process 700 is executed. The notation herein designates the energy margin up to the current time as $E_0$. In some embodiments, the energy consumption for a facility includes energy consumption of equipment located at or directly serving the building (e.g., providing heating or cooling to the facility). In some embodiments, consumption for the facility includes consumption associated with transportation of goods and/or people to and from the facility or otherwise associated with the operation of the facility, for example energy consumption by transportation vehicles (e.g., cars, trucks, trains, planes, ships, etc.).

At step 704, energy consumption of the facility 600 for a future time period (e.g., an upcoming time period) is predicted, for example using a neural network trained to predict future energy consumption. The energy consumption predicted at step 704 can be a total energy consumption over the entire future time period, or the energy consumption can be predicted for particular time steps (e.g., sub-portions of the future time period discretized at any level of granularity), as a continuous function, etc. The notation herein designates the energy consumption as $E_{consumed}$. The energy consumption predicted at step 704 may be the energy consumption of the facility 600 in the absence of load shaving (e.g., energy conservation measures, curtailment, etc.). If load shaving is subsequently employed, the actual energy consumption of the facility 600 may be less than the amount predicted in step 704, as described below.

At step 706, energy production of the facility 600 for a future time period (e.g., an upcoming time period) is predicted, for example using a neural network trained to predict future energy production. The energy production predicted at step 706 can be a total energy production over the entire future time period, or the energy production can be predicted for particular time steps (e.g., sub-portions of the future time period discretized at any level of granularity), as a continuous function, etc. The notation herein designates the energy production as $E_{produced}$. In some embodiments, the energy production of the facility 600 over the future time period is predictable (e.g., as a function of sunlight, weather patterns, etc.), but not controllable.

At step 708, an amount of energy to be shaved over the future time period to achieve net zero consumption is calculated. The amount of energy to be shaved may be calculated as $E_{shave}=E_{consumed}-E_{produced}-E_0$, where $E_{shave}$ is the amount by which energy predicted to be consumed over the future time period exceeds the amount of energy predicted to be produced over the future time period while accounting for the energy margin (i.e., surplus energy generated up to the current time). Accordingly, $E_{shave}$ represents the amount by which the predicted energy consumption $E_{consumption}$ needs to be reduced to achieve net zero energy over the time period. In another formulation, the amount of energy to be shaved over a future time period from $T_0$ to $T_1$ is the amount by $\int_{T_0}^{T_1} E_{consumed}$ must be reduced to ensure that $E_0^{T_0}+\int_{T_0}^{T_1} E_{produced}-\int_{T_0}^{T_1} E_{consumed} \geq 0$. In scenarios where this inequality is satisfied without load shaving (i.e., no load shaving is needed to achieve net zero status), process 700 can stop at step 708.

At step 710, the energy to be shaved is allocated (e.g., distributed, broken down, divided, sorted, etc.) across energy loads 604, for example based on the flexibility of different energy loads 604 and relative loads. For example, in one scenario, energy consumed by HVAC equipment 614 may account for a large relative fraction of the total energy load (i.e., total energy consumption of all the energy loads 604) and may be relatively flexible (depending on the facility's tolerance for mild occupant discomfort, for example) as compared to other domains (e.g., data center equipment that is difficult to control, lighting that must be on at certain times to allow people to see in a space, etc.). Step 710 works to allocate the total energy to be shaved across the energy loads 604 so that each energy load (e.g., each building domain) is assigned a particular amount energy that should be shaved by that particular energy load (e.g., a first load shaving amount for the HVAC equipment 614, a second load shaving amount for the lighting devices 616, a third load shaving amount for the appliances 618, etc.). The actions taken by each of the energy loads 604 to achieve the assigned amount of load shaving may include, for example, changes in operation of that energy load relative to the predicted baseline operation of that energy load.

At step 712, operations changes to achieve the energy to be shaved for each energy load 604 are back calculated Artificial intelligence models for each energy load 604 (e.g., a model for HVAC equipment 614, a model for lighting devices 616, a model for appliances 618, a model for computing and data center equipment 620, etc.) can be used to predict the amount of energy savings that can be achieved by different operational changes. The models may also account for constraints or penalties associated with negative effects on the facility performance and utility (e.g., occupant discomfort, reduced productivity, scheduling inconveniences, etc.) which guide the operational changes to still provide acceptable facility performance and utility while achieving the energy load shaving. Step 712 outputs a set of operational changes (e.g., setpoint changes, on/off decisions, schedules, etc.) that can be implemented by controlling the energy loads 604 in accordance with the operational changes. By implementing the operational changes over the time period, an amount of energy is shaved from the predicted baseline energy so that $E_0^{T_0}+\int_{T_0}^{T_1} E_{produced}-\int_{T_0}^{T_1} E_{consumed} \geq 0$. In this inequality, the value of $\int_{T_0}^{T_1} E_{consumed}$ may be reduced relative to the value predicted in step 704 as a result of the operational changes made in step 712.

Figure 8:
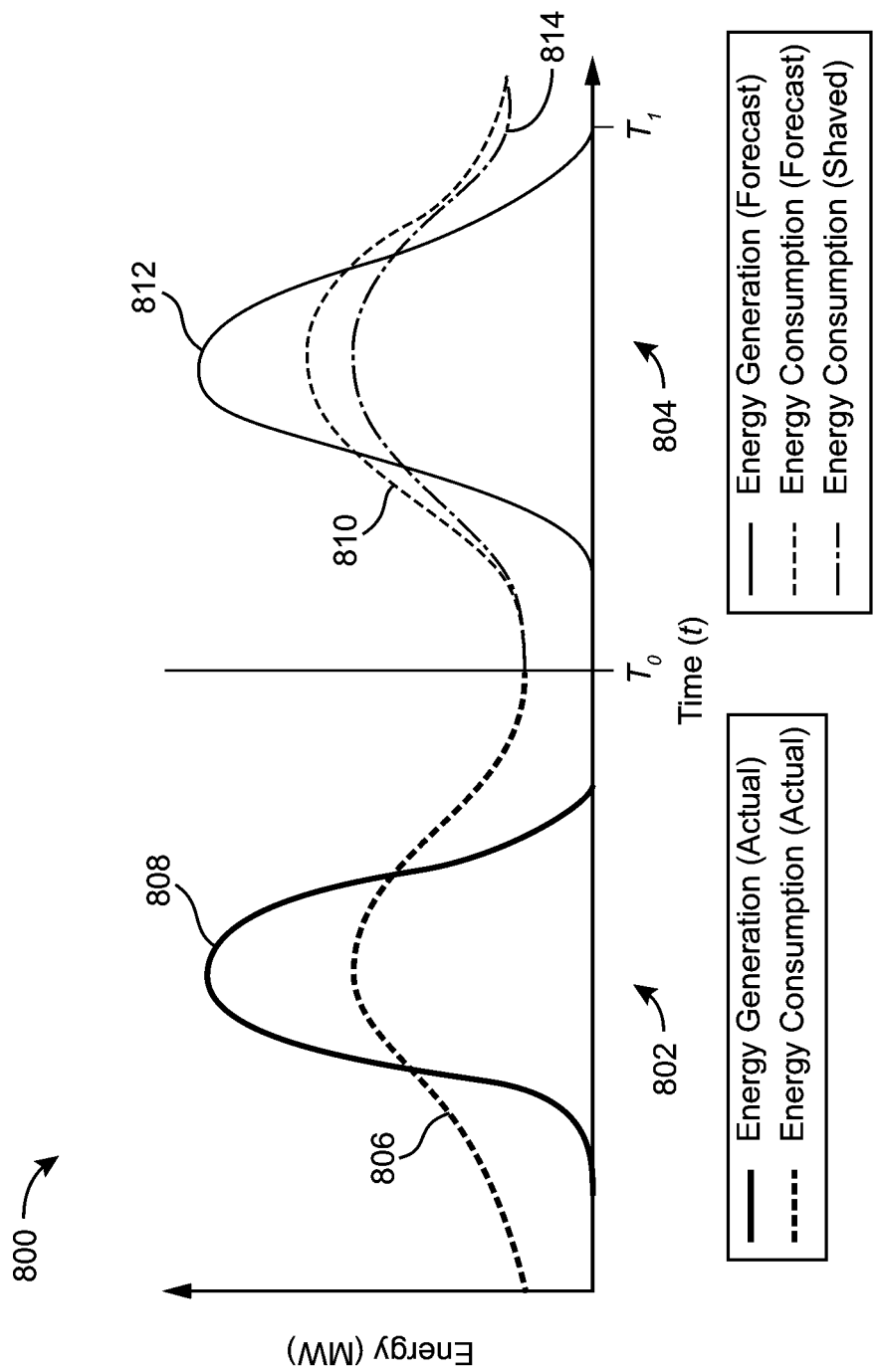
FIG. 8 is a set of graphs of energy consumption and production data relating to the process of FIG. 7, according to some embodiments.

Referring now to FIG. 8, a graph 800 of energy amounts that may be involved in an example execution of process 700 is shown, according to some embodiments. In particular, FIG. 8 shows a first region 802 before time $T_0$ and a second region 804 after time $T_0$ and through time $T_1$. Process 700 can be executed at or near (e.g., momentarily before) time $T_0$ and for the period through time $T_1$.

The graph 800 shows an actual energy consumption line 806 and an actual energy generation line 808 in the first region 802 representing actual (e.g., measured) values of energy consumption and production over a time period up to time $T_0$, for example a one-day period. As shown, both the energy consumption line 806 and the actual energy generation line 808 follow a curve that increases in a middle of the period (e.g., in the middle of the day). As one possibility, the graph 800 may represent a scenario where both photovoltaic energy production and energy demand spikes in the middle of a day (e.g., due to increased solar irradiation and associated cooling demand around noon on a sunny summer day). In the first region 802, the actual energy consumption line 806 and the actual energy generation line 808 intersect twice. That is, consumption is greater than generation at some moments in time and consumption is less than generation at other points in time. Although the first region 802 includes periods where energy consumption was greater than energy generation, the first region 802 represents a net zero energy period if the area under the energy consumption line 806 in the first region 802 is equal to or less than the area under the energy generation line 808 in the first region 802. The difference between the area under the energy generation line 808 in the first region 802 and the energy consumption line 806 in the first region 802 represents the energy margin (i.e., surplus energy generated) in the first time period before time $T_0$.

The second region 804 shows forecasts over the time period $T_0$ to $T_1$. In particular, an energy consumption forecast line 810, an energy generation forecast line 812, and a shaved energy consumption line 814 are shown. The energy consumption forecast line 810 illustrates energy predicted to be consumed over time period $T_0$ to $T_1$ (e.g., output from step 704). The energy generation forecast line 812 illustrates energy predicted to be generated over time period $T_0$ to $T_1$ (e.g., output from step 706). The shaved energy consumption line 814 represents the amount of energy forecast to be consumed if operational changes are made to shave energy relative to the baseline prediction represented by the energy consumption forecast line 810 (e.g., as a result of step 712).

In the graph 800 and in the second region 804, the total amount of energy to be shaved to achieve net zero energy is the difference between the area under the energy consumption forecast line 810 and the area under energy generation forecast line 812, while the total amount of energy predicted to be shaved is the area between the energy consumption line 810 and the shaved energy consumption line 814. Accordingly, if the area between the energy consumption line 810 and the shaved energy consumption line 814 (plus the energy margin, if any, from the first region 802) is greater than or equal to the difference between the area under the energy consumption forecast line 810 and the area under energy generation forecast line 812, then the graph 800 illustrates a scenario where energy consumption is shaved to achieve net zero energy consumption by time $T_1$.

Figure 9:
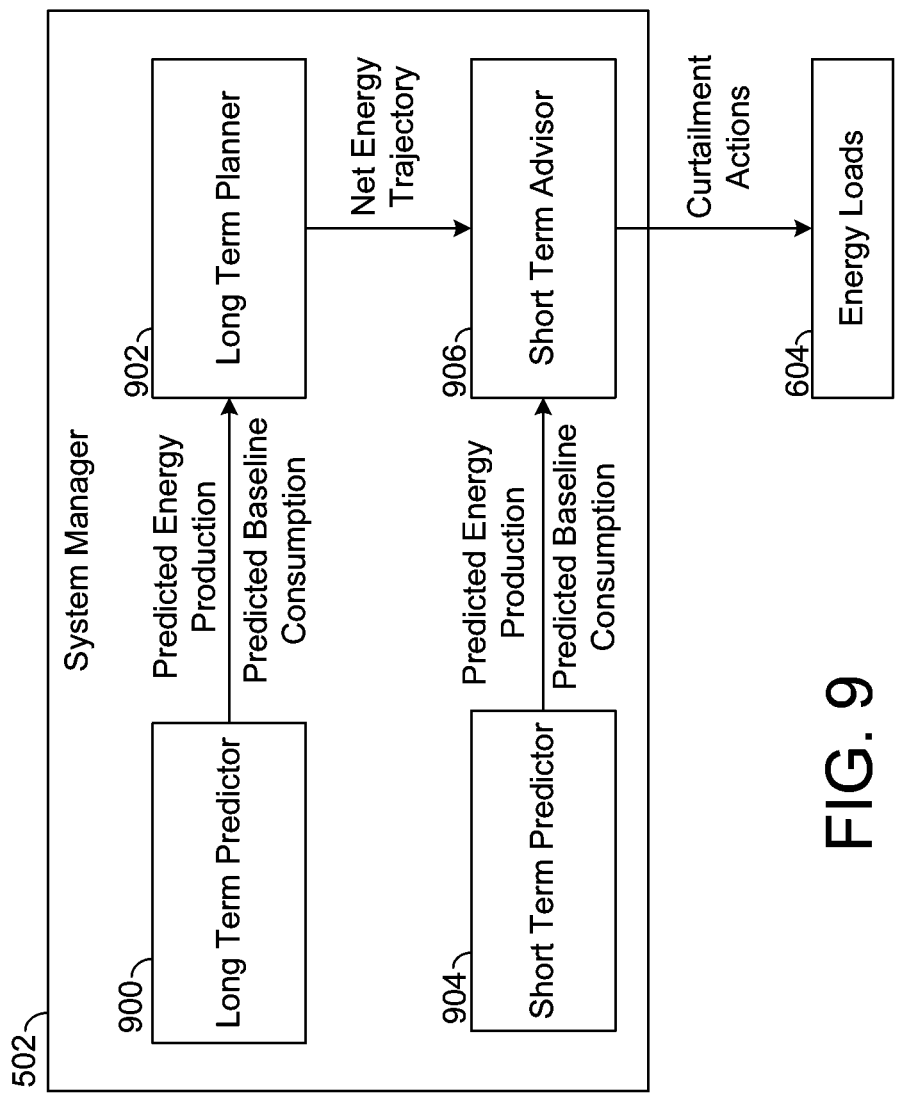
FIG. 9 is block diagram of a system manager of the net zero energy facility, according to some embodiments.

Referring now to FIG. 9, a block diagram of system manager 502 (or a portion thereof) is shown, according to some embodiments. The system manager 502 can be implemented using circuitry that includes one or more processors and one or more non-transitory computer-readable media storing program instructions, that, when executed by one or more processors of the system manager 502, causes the one or more processors to perform the operations attributed to the system manager 502 herein. The system manage 502 may be located at the facility 600, can be implemented as a cloud resource or other software-as-a-service platform, or some combination thereof, for example.

As illustrated in FIG. 9, the system manager 502 provides a cascaded control architecture, where a first predictive optimization is performed to determine a net energy trajectory over a first, longer time period (e.g., one month, one quarter, one year, etc.) and the net energy trajectory is used as an input to a second predictive optimization performed over a subperiod of the first, longer time period (e.g., over one week, one day, one hour, etc.) to determine curtailment actions for the energy loads 604. The system manager 502 is shown as including a long term predictor 900, a long term planner 902, a short term predictor 904, and a short term advisor 906. The system manager 502 is shown as being communicable with energy loads 604.

The long term predictor 900 is configured to predict baseline energy consumption and energy production by the facility 600 over a first time period. The first time period may correspond to a period of interest to stakeholders (building managers, owners, business leaders, shareholders, regulatory agency, etc.) over which such stakeholders expect the facility 600 to achieve net zero energy consumption. For example, the first time period may be one year (e.g., a company's fiscal year, a calendar year). As another example, the first time period may be a quarter (i.e., a three-month period). As another example, the first time period may be a month. The long term predictor 900 can use climate data, historical building data (e.g., data for the particular facility 600 from prior time periods, data from similar facilities, etc.), and various modeling techniques to predict baseline energy consumption and energy production over the first time period. The predictions preferably include forecasted timeseries or continuous functions of baseline energy consumption and production across the first time period.

The long term planner 902 is configured to uses the predicted baseline energy consumption and energy production by the facility 600 as inputs to a first predictive optimization. The long term planner 902 may also predict utility rates or other time-varying characteristics relating to energy use (e.g., marginal operating carbon emissions rates). The long term planner 902 executes the predictive optimization to output a net energy trajectory for the first time period. The net energy trajectory indicates values of the net energy consumption at moments in time within the time period, for example a timeseries of net energy values associated with time steps in the time period. The first predictive optimization is preferably constrained so that the net energy trajectory achieves a value of zero at the end of the first time period, while allowing the net energy trajectory to take different values over the time period.

The first predictive optimization may minimize a predicted cost over the time period. For example, the long term planner may include an objective function that accounts for a cost of operating the facility 600 over the time period as a function of the net energy trajectory and the predictions for the baseline energy consumption and production (e.g., costs of buying grid energy or other resources, maintenance costs, internalized costs of carbon emissions or other pollution associated with use of grid energy, etc.). The long term planner 902 can execute the predictive optimization to find the net energy trajectory that minimizes the objective function over the time period. For example, time-shifting energy consumption to better align consumption with production can help to reduce the overall value of the objective function. As another example, time-shifting energy consumption away from peak demand periods for the utility grid can help reduce costs, marginal emissions, etc. associated with operation of the facility. As another example, shaving loads may be cheaper, more sustainable, less emitting, etc. at certain times in the first time period as compared to other time. The long term planner 902 is configured to handle any such considerations in order to output the net energy trajectory for the time period.

The long term planner 902 thereby outputs a net energy trajectory indicating values of the net energy consumption at moments in time within the time period. Additional details of some embodiments are shown below with reference to FIG. 10. The net energy trajectory is provided as an input to short term advisor 906 as illustrated in FIG. 9.

The short term predictor 904 is configured to predict energy production and baseline energy consumption over a subperiod of the time period used by the long term predictor 900 and the long term planner 902, for example one day or one week. The short term predictor 904 may also predict utility rates, marginal operating emissions rate, etc. over the subperiod. While the long term predictor 900 may use general climate data, for example, the short term predictor 904 operates over a shorter timeline where weather forecasts (e.g., from a third-party weather service) are relative reliable and can be used for prediction of energy production and baseline energy consumption. Because of the shorter prediction horizon, the predictions by the short term predictor 904 are typically more accurate (i.e., closer to the actual conditions that occur) than the outputs of the long term predictor 900. The cascaded architecture of the system manager 502 thereby benefits from generating predictions by the short term predictor 904 at the beginning of subperiods of the longer time period to facilitate higher quality operation of the short term advisor 906 described in the following.

Figure 11:
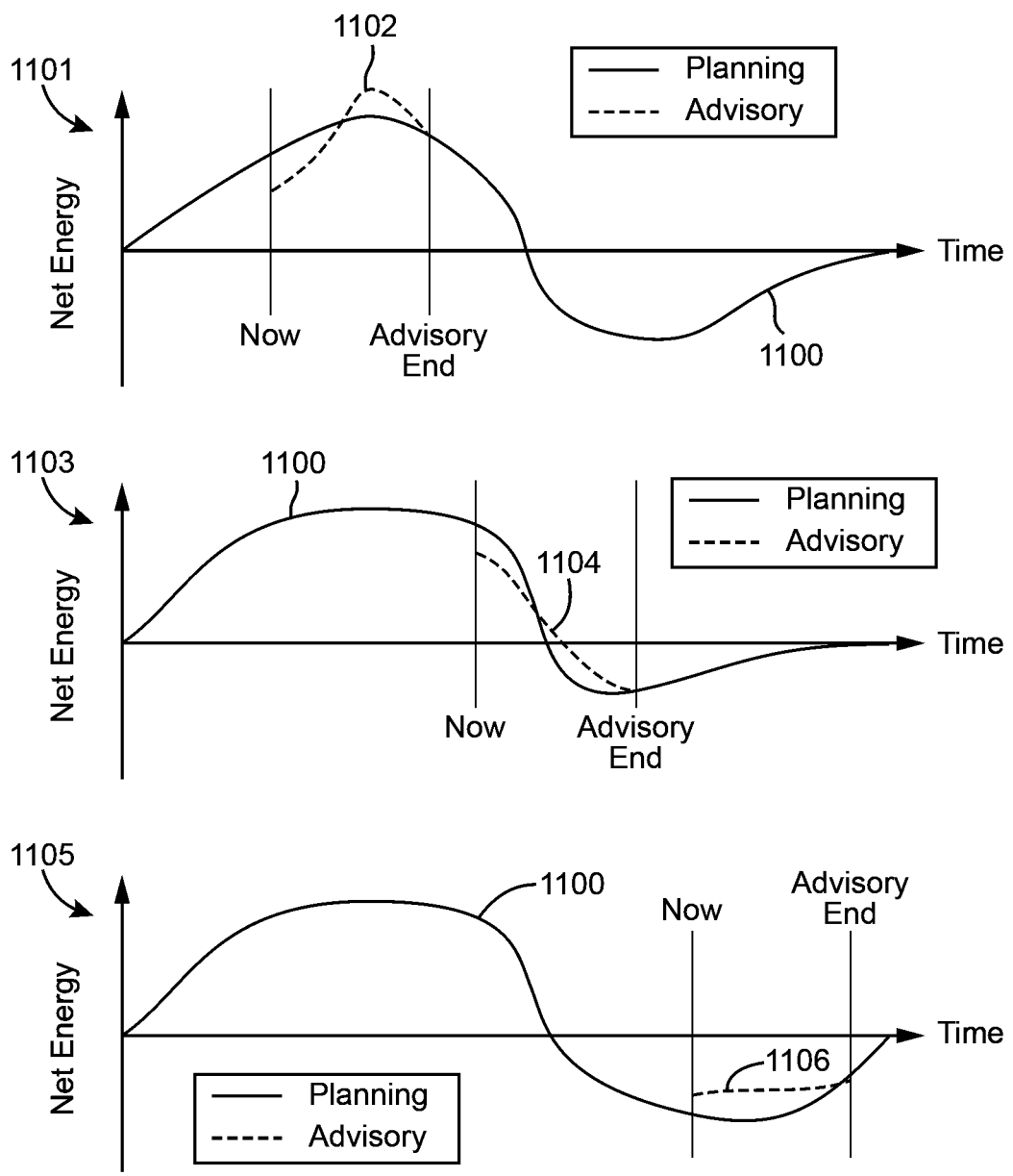
FIG. 11 is a set of graphs relating to the process of FIG. 10, according to some embodiments.

The short term advisor 906 is configured to use the net energy trajectory from the long term planner 902 and the predictions from the short term predictor 904 to determine curtailment actions to be implemented during the subperiod via the energy loads 604 to shave energy consumption such that actual net energy tracks the net energy trajectory for the subperiod. For example, the short term advisor 906 can determine curtailment actions that the short term advisor 906 predicts will cause actual net energy consumption from a beginning of the first time period to the end of the subperiod to equal the value of the net energy trajectory for the end of the subperiod. Example graphical illustrations of such a goal, constraint, etc. are shown in FIG. 11 and described with reference thereto.

The short term advisor 906 may be configured to determine the curtailment actions as outputs of a predictive optimization executed by the short term advisor 906. The predictive optimization may minimize an impact of implementing the curtailment actions. In such examples, the short term advisor 906 can use predictive models for different types of energy loads (e.g., for different building domains) which predict impacts of the curtailment actions on operating costs, emissions, pollution, facility productivity, occupant discomfort, etc. For example, the short term advisor 906 may run a model that associates a reduction of energy consumption by computing equipment 620 or appliances 618 with a reduction in productivity (e.g., characterized in financial terms), such that the short term advisor 906 can assign numerical cost values associated with different curtailment option. As another example, the short term advisor 906 may run a model that provides a numerical penalty value based on occupant discomfort associated with attempts to curtail energy consumption of HVAC equipment. Various costs (financial or otherwise) can thus be associated with different curtailment options by the short term advisor 906. The short term advisor 906 can then run an optimization over the different curtailment options and using the associated costs of the curtailment options, the short-term prediction of baseline energy consumption over the subperiod, the short-term prediction of energy production over the subperiod, an indication of an actual (e.g., measurement-based) net energy amount at the beginning of the subperiod, and the net energy trajectory in order to determine a set of curtailment actions predicted to achieve the target defined by the net energy trajectory at minimal negative impact to facility performance (e.g., minimized predicted cost).

The short term advisor 906 thus outputs curtailment actions to be implemented by the energy loads 604. As shown in FIG. 9, the curtailment actions can be communicated from the system manager 502 to the energy loads 604, for example in the form of electronic requests, control signals, etc. that cause the energy loads 604 to implement the curtailment actions. In some embodiments, further optimizations or predictive control processes are performed in a distributed manner at local controllers for the energy loads 604 to optimally implement the curtailment actions. In some embodiments, the energy loads 604 are configured provide feedback to the short term advisory 906 if a curtailment action is not feasible, so that the short term advisor 906 and/or the long term planter 902 can re-run (e.g., with an additional constraint) to find a feasible solution. The energy loads 604 (e.g., HVAC equipment 614, lighting devices 616, appliances 618, and computing equipment 620) thereby operate based on the outputs of the short term advisor 906.

Figure 10:
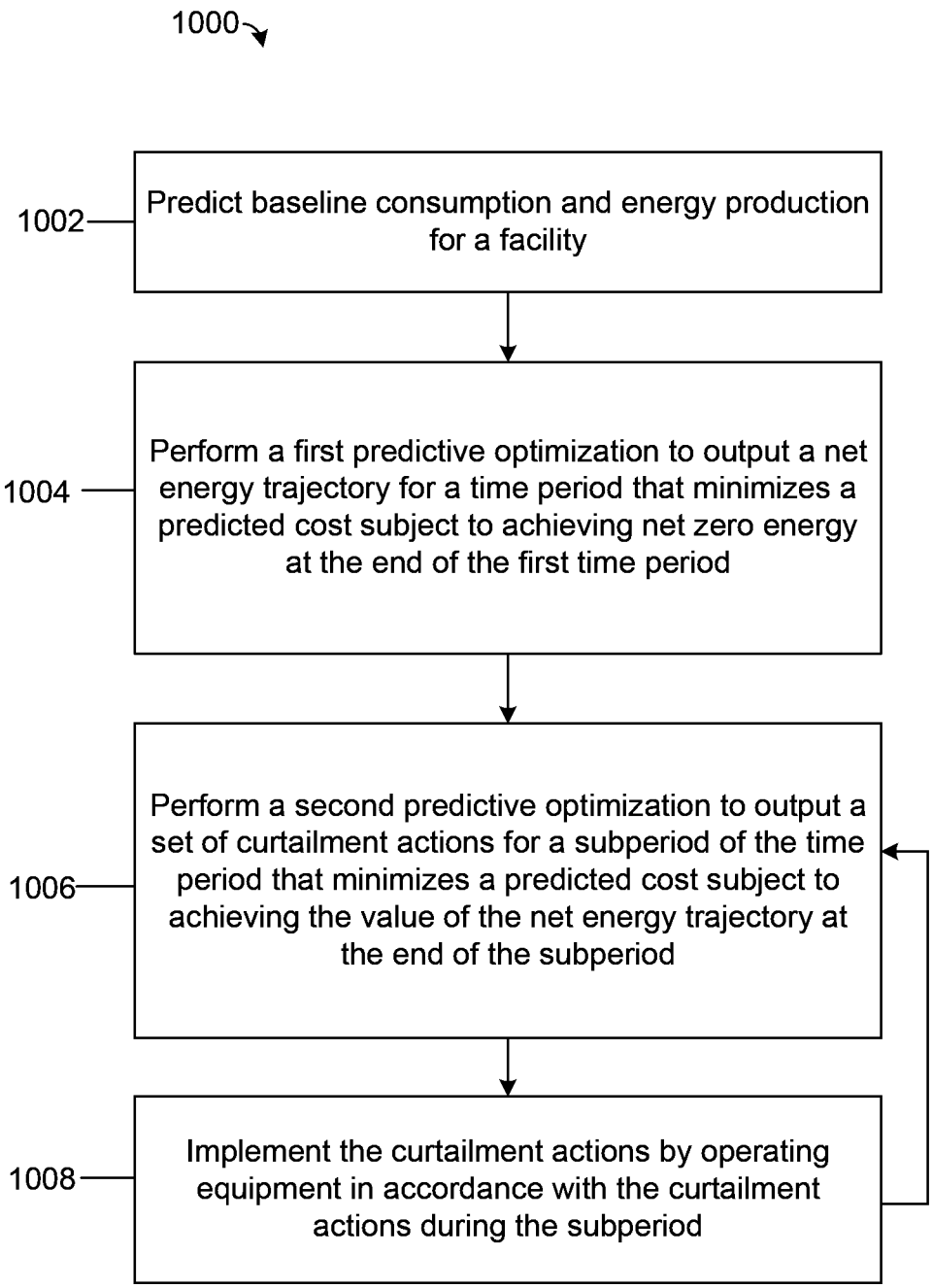
FIG. 10 is a flowchart of another process of achieving net zero energy, according to some embodiments.

Referring now to FIG. 10, a flowchart of a process 1000 for providing a net zero energy facility is shown, according to some embodiments. The process 1000 can be executed by the facility 600, for example by operation of the system manager 502.

At step 1002, baseline energy consumption and energy production are predicted for a facility. A baseline energy consumption amount $\beta_t$ can be predicted for each of multiple periods t (e.g., for t=1, . . . , T). An energy production amount $\gamma_t$ can also be predicted for each of the multiple periods t. The values of $\beta_t$ and $\gamma_t$ can be predicted using various artificial intelligence approaches trained on historical data, for example. In some embodiments, the energy consumption for a facility includes energy consumption of equipment located at or directly serving the building (e.g., providing heating or cooling to the facility). In some embodiments, consumption for the facility includes consumption associated with transportation of goods and/or people to and from the facility or otherwise associated with the operation of the facility, for example energy consumption of transportation vehicles (e.g., cars, trucks, trains, planes, ships, etc.).

At step 1004, a first predictive optimization is performed to output a net energy trajectory $\{X_t\}$ for a time period (t=1, . . . , T) that minimizes a predicted cost subject to achieving net zero energy at the end of the first time period ($X_T \leq 0$). The first predictive optimization may solve a problem formulated as:

$$\min_{C_t} \sum_t \phi_t(C_t) \text{ such that } \sum_t (1-C_t)\beta_t \leq \sum_t \gamma_t \text{ and } 0 \leq C_t \leq \overline{C}_t \forall t$$

where $C_t$ is an amount of curtailment at time t (expressed as a fraction or percentage in the example shown), $\phi_t(\cdot)$ is a function indicating a cost of curtailment in period t, and $\overline{C}_t$ is less than or equal to one and represents a maximum allowed curtailment for period t. That is, $\phi_t(C_t)$ characterizes a cost of reducing consumption relative to predicted baseline $\beta_t$ by an amount of energy $C_t * \beta_t$. In some embodiments, $\phi_t(\cdot)$ models or predicts and operational cost or penalty associated with the consumption. In other embodiments, $\phi_t(\cdot)$ is chosen as a convex function representing that small curtailments are exponentially easier than large curtailments. For example, in some embodiments, $\phi_t(c) = c^k$, k>1.

The inequality constraint $\Sigma_t(1-C_t)\beta_t \leq \Sigma_t \gamma_t$ constrains the predictive optimization to achieve net zero energy consumption, i.e., consumption greater than production. In other embodiments, especially in scenarios where net zero consumption may not always be feasible, the problem is formulated with the constraint expressed as a penalty $\psi(X)$, for example with an objective:

$$\min_{C_t} \sum_t \phi_t(C_t) + \psi(X), \text{ where } X = \sum_t (1-C_t)\beta_t - \sum_t \gamma_t.$$

In some embodiments, the optimization problem at step 1004 is reformulated as a discrete-time stochastic control process, for example a Markov decision process (MDP). In such examples, the optimization problem solved in step 1004 can be expressed as: $\min_{X_t, C_t} \Sigma_t \phi_t(C_t)$ such that $X_{t+1} = X_t + (1-C_t)\beta_t - \gamma_t$, $X_T \leq 0$, and $0 \leq C_t \leq \overline{C}_t$, $\forall t$, where $X_t$ is the net energy consumption at the beginning of period t (and at the end of period t−1). The constraint $X_T \leq 0$ requires consumption to be non-positive at the end of the optimization horizon. In such embodiments, the solution to such a problem and the output of step 1004 is a timeseries of values of net energy consumption $X_t$, referred to herein as a net energy trajectory $\{X_t\}$, t=1, . . . , T.

In some embodiments, step 1004 includes executing a stochastic optimization. In such embodiments, the problem solved at step 1004 is formulated as:

$$\min_{\kappa(\cdot)} \mathbb{E}\left( \sum_t (\phi_t(C_t) + \psi(X_{t+1}) - \psi(X_t)) \right) \text{ such that}$$

$$X_{t+1} = X_t + (1-C_t)\overline{\beta}_t \exp(\xi_t) - \overline{\gamma}_t \exp(\zeta_t)$$

$$\xi_{t+1} = \lambda_\xi \xi_t + \mathcal{N}(0, \sigma_\xi)$$

$$\zeta_{t+1} = \lambda_\zeta \zeta_t + \mathcal{N}(0, \sigma_\zeta)$$

$$C_t = \kappa(X_t, \xi_t, \zeta_t, t)$$

where $\beta_t$ is produced by a multiplicative random walk ($\beta_t = \overline{\beta}_t \exp(\xi_t)$, $\xi_t = \lambda \xi_t + \epsilon_t$, $\epsilon_t \sim \mathcal{N}(0,\sigma)$ iid, $\lambda \leq 1$) where the Markov state is the current level $\xi_t$. A similar structure can be used for energy production $\gamma_t$ with rand om variable $\zeta_t$. Such a formulation has separate random trajectories for each of $\beta_t$ and $\gamma_t$. Thus, the overall Markov state is $(X_t, \xi_t, \zeta_t)$ and the optimal curtailment policy is some function $C_t = \kappa(X_t, \xi_t, \zeta_t, t)$. Step 1004 executes an optimization to find optimal $\kappa(\cdot)$, for example using certainty equivalence model predictive control, dynamic programming, reinforcement learning, or direct policy optimization.

At step 1006, a second predictive optimization is performed to output a set of curtailment actions $\{U_{kt}\}$ for a subperiod t of the time period up to time T that minimizes a predicted cost subject to achieving the value of the net energy trajectory at the end of the subperiod (i.e., $X_{t+1}$). In some embodiments, the optimization problem at step 1006 is formulated as min $\Sigma_t\Sigma_k\phi_{kt}(U_{kt})$ such that $C_{kt}=\pi_{kt}(U_{kt})$ and $\Sigma_t(\gamma_t-\Sigma_k(1-C_{kt})\beta_{kt})\geq\chi$, where k indicates a curtailment category (building domain, energy load type) (e.g., HVAC, lighting, plug load, etc.), $U_{kt}$ indicates a curtailment action for category k during period t, $C_{kt}$ is a curtailment fraction for category k during period t, $\phi_{kt}(\cdot)$ models the cost of curtailment actions for category k during period t, $\pi_{kt}(\cdot)$ is a curtailment model for category k during period t predicting the amount of curtailment that would result from a curtailment action, $\beta_{kt}$ is a predicted baseline energy consumption for category k during period t, $\gamma_t$ is predicted energy production during period t, and x is a net energy target for the period t from step 1004. In some embodiments $\chi=X_{t+1}-X_t$, i.e., the change in the net energy trajectory from step 1004 associated with period t. In other embodiments, $\chi=X_{t+1}-X_{actual,t}$, where $X_{actual,t}$ is a measured net energy consumption up to time step t (e.g., since t=1). In some embodiments, the cost of curtailment actions accounts for multiple objectives (e.g., utility prices, occupant comfort, carbon emissions, pollution, air quality, etc.). In some such embodiments the predictive optimization of step 1006 (or other control processes herein) can include a process for tuning one or more weights of an objective function to facilitate tracking to the net energy trajectory over time, for example as described in U.S. patent application Ser. No. 17/686,320, filed Mar. 3, 2022, the entire disclosure of which is incorporated by reference herein.

The curtailment actions indicated by $U_{kt}$ are the main decision variables of the optimization problem solved in step 1006 and can indicate various actions depending on the associated category k. For example, for an HVAC category, $U_{kt}$ can be a zone temperature setpoint or setpoint change (e.g., +2°, −5°, etc.). For a lighting category, $U_{kt}$ can indicate a lighting level or a fraction of rooms to be lit. The amount of curtailment $C_{kt}$ produced by action $U_{kt}$ is specified by the function $\pi_{kt}(\cdot)$, which may be a simple (e.g., nonlinear) data-driven model. Step 1006 can be formulated as a deterministic problem, for example because the horizon of step 1006 is shorter than for step 1004 (i.e., one subperiod t compared to longer time span t=1, . . . , T. In some embodiments, step 1006 uses user preferences input via a user interface which specify which categories of loads a user would prefer to curtail (e.g., a ranking or priority list). The user interface can be updated over time as the subperiods elapse, for example showing changing curtailment options over time and/or displaying a visualization of actual performance relative to the planed net energy trajectory. In some embodiments, the curtailment actions can include deploying (e.g., installing, bringing online, starting up, etc.) a new device of equipment (e.g., energy storage equipment, green energy production equipment, efficient HVAC equipment, etc.), with the step 1006 determining a size, capacity, type, model, etc. of the new device to be deployed (e.g., following various teachings described in U.S. Provisional Patent Application No. 63/246,177, filed Sep. 20, 2021, the entire disclosure of which is incorporated by reference herein).

In some embodiments, finding the curtailment actions $U_{kt}$ can be performed by walking a building graph of a digital twin of the facility. Digital twins may include digital entities (e.g., data objects, software agents, etc.) that represent real-world entities such as building equipment, systems, spaces, persons, time series data, or any other building-related entity. Several examples of digital twins and a framework/platform which can be used to define connections between digital twins (e.g., causal relationships, functional relationships, spatial relationships, etc.) are described in detail in U.S. patent application Ser. No. 17/354,436 filed Jun. 22, 2021, U.S. patent application Ser. No. 17/134,661 filed Dec. 28, 2020, U.S. patent application Ser. No. 17/134,664 filed Dec. 28, 2020, U.S. patent application Ser. No. 17/134,671 filed Dec. 28, 2020, U.S. patent application Ser. No. 17/134,659 filed Dec. 28, 2020, U.S. patent application Ser. No. 17/134,973 filed Dec. 28, 2020, U.S. patent application Ser. No. 17/134,999 filed Dec. 28, 2020, U.S. patent application Ser. No. 17/135,023 filed Dec. 28, 2020, U.S. patent application Ser. No. 17/134,691 filed Dec. 28, 2020, U.S. patent application Ser. No. 17/135,056 filed Dec. 28, 2020, U.S. patent application Ser. No. 17/135,009 filed Dec. 28, 2020, U.S. patent application Ser. No. 17/504,121 filed Oct. 18, 2021, and U.S. patent application Ser. No. 17/737,873, filed May 5, 2022. The entire disclosure of each of these patent applications is incorporated by reference herein.

For example, a digital twin building knowledge graph can be queried for twins that match certain criteria and actuations can be made at a granular level (e.g., at the level of specific dimmable lighting devices, etc.). Use of a digital twin approach allows decisions to be based on user preferences, sustainability considerations, comfort preferences and can provide highly granular curtailment actions $U_{kt}$ (e.g., associated with particular devices, equipment units, etc.). The digital twin approach can also serve to easily link the net zero algorithms described herein to different facilities, for example enabling easily installation and configuration of the features described herein and easy adaptability as new devices, equipment, energy loads are added (or removed) from a facility.

Execution of step 1006 thereby outputs curtailment actions $U_{kt}$. At step 1008, the curtailment actions $U_{kt}$ are implemented by operating equipment in accordance with the curtailment actions $U_{kt}$ during the subperiod. Step 1006 can include sending control signals to energy loads 604 such that the energy loads 604 operate to shave energy relative to the predicted baseline energy consumption in accordance with the curtailment actions $U_{kt}$. Steps 1006 and 1008 can be repeated for periods t until final period t=T so that net zero energy consumption is achieved at the end of the overall optimization period t=1, . . . , T. Execution of process 1000 thereby provides a net zero energy facility.

Referring now to FIG. 10, a set of graphs of net energy over time which is illustrative of an example execution of process 1000 is shown, according to some embodiments. In the example of FIG. 10, step 1004 has been executed to generate a net energy trajectory illustrated by line 1100 in the graphs shown. The net energy trajectory from step 1004 is used at multiple iterations of step 1006, as illustrated by its inclusion in the multiple graphs of FIG. 10.

In a first graph 1101, step 1004 has run to generate curtailment actions that result in the net energy shown by short term advisory line 1102. The short term advisory line 1102 starts from an actual energy consumption at the beginning of a subperiod and achieves (becomes equal with) the net energy trajectory (line 1100) by the end of the subperiod. Advantageously, this approach enables correction of any prior deviations from the net energy trajectory at each short-term advisory stage (e.g., at each instance of step 1006). The first graph 1101 also illustrates that the short term advisory line 1102 is allowed to deviate from the net energy trajectory (line 1100) during the subperiod, so long as the lines converge at the end of the subperiod. This flexibility can enable savings and improve the feasibility of tracking the net energy trajectory.

A second graph 1103 shows another short term advisory line 1104 for a later subperiod. As for the first graph 1101, the short term advisory line 1104 for the later subperiod is allowed to deviate from the net energy trajectory (line 1100) during the subperiod but reaches the value of the net energy trajectory by the end of the subperiod, such that lines 1100 and 1104 converge at the end of the subperiod. A fourth graph 1105 of FIG. 11 shows a similar arrangement, where a short term advisory line 1106 for the corresponding subperiod reaches the value of the net energy trajectory by the end of the corresponding subperiod such that the short term advisory line 1106 converges with the line 1100. FIG. 11 thereby illustrates how the cascaded architecture of FIG. 9 and the multiple optimizations of FIG. 10 can be executed in an example scenario to achieve net zero energy consumption by providing a net energy trajectory comprising net energy targets for a plurality of subperiods of a time period, generating, at each subperiod of the plurality of subperiods, a set of curtailment actions predicted to achieve the net energy target for the subperiod, and implementing the sets of curtailment actions. Building managers, owners, and other stakeholders can thus be reliably ensured that their facilities will achieve net zero energy consumption over a time period of interest.

Although the examples above refer primarily to energy consumption and production to achieve net zero energy over a time period, the teachings herein can be adapted to other types of net consumption such as resource consumption (e.g., water consumption, gas consumption, fuel cell consumption, hydrogen consumption, raw materials, goods) and consumption characterized by amount of pollution (e.g., carbon emissions, particulate emissions, sound pollution, light pollution, etc.). Consumption can be offset by production of resources (e.g., production of hydrogen fuel, rainwater collection) or by other offset action (e.g., capturing or sequestering carbon, filtering pollutants, recycling, etc.). The present disclosure thus includes disclosure of approaches for achieving net zero consumption or other target amount of net consumption for various types or combinations of consumption over a time period by implementing the various features described herein.

Intelligent Load Shedding and/or Shifting

Figure 12:
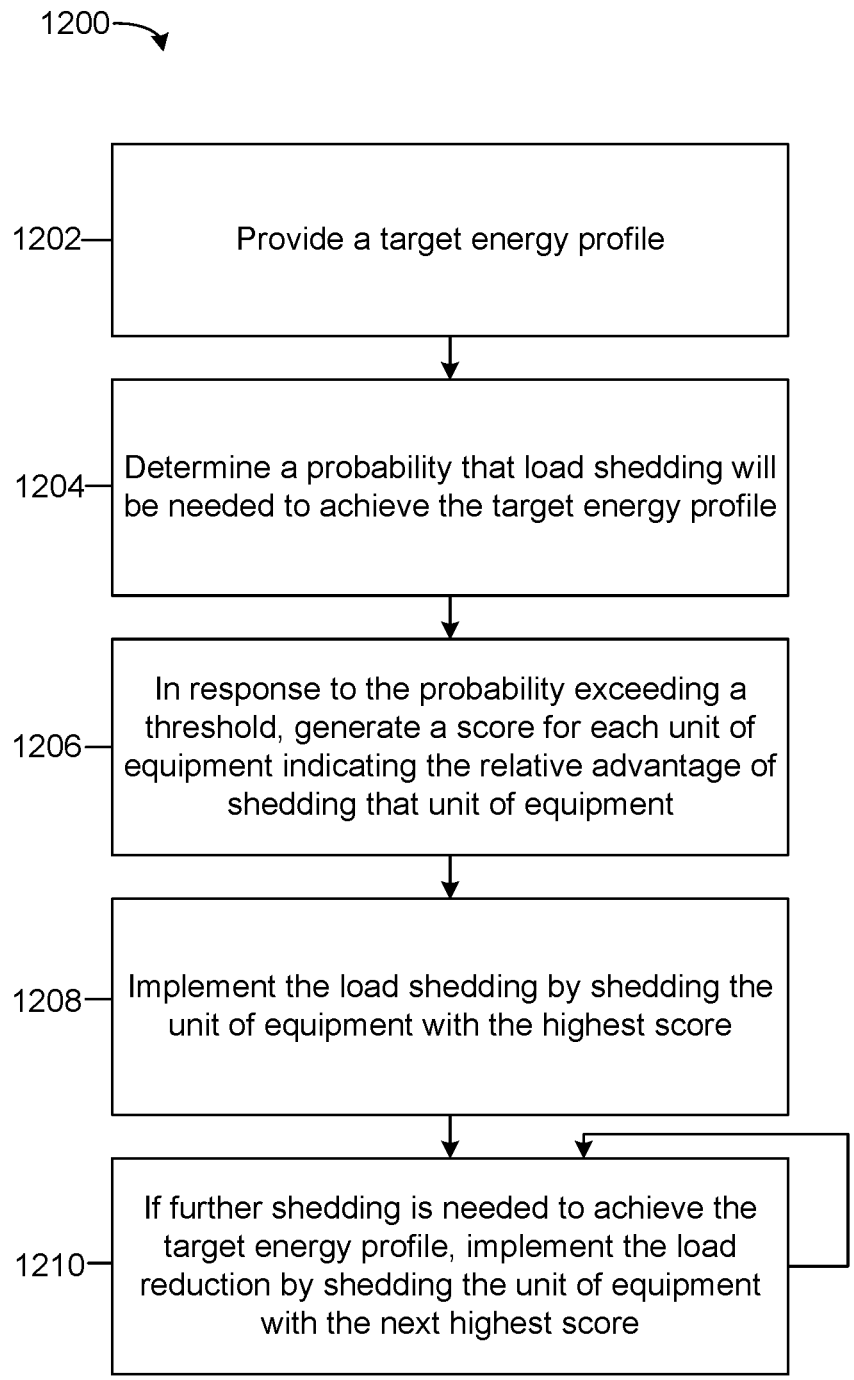
FIG. 12 is a flowchart of a process for load shedding, according to some embodiments.

Referring now to FIG. 12, a flowchart of a process 1200 for making and implementing load shedding and/or shifting decisions is shown, according to some embodiments. The process 1200 can be executed by the system manager 502, the BMS controller 366, one or more other systems or devices described herein, and/or other controller, circuitry, computing resource, etc. in various embodiments. For example, one or more computer-readable media can store instructions executable to cause one or more processors to perform the operations of process 1200 described below. In some embodiments, process 1200 is executed as part of or as an alternative to steps 1006 and 1008 of process 1000 of FIG. 10. Although process 1200 refers to load shedding, the teachings can be also or alternatively applied to load shifting.

At step 1202, a target energy profile is provided. The target energy profile indicates a target amount of energy consumption, for example a target amount of energy consumption for each time step in a time period (e.g., each hour in a day, every fifteen minutes, each day in a week, etc.). The target energy profile can be generated as discussed in the examples above, for example as a result of an optimization or other process configured to drive cumulative net energy to a goal (e.g., zero) over a time period.

In some embodiments, the target energy profile is found using a target load model, for example denoted by $\overline{Eb}(t)$. In some embodiments, the target load model can be represented as $$\overline{Eb}(t) = \text{Min} \left| f\left(\overline{Yp}(\omega(Td, OA(Amb), t), Y(t|t-1), c(t), \Delta x(t|t-1)\right) \right|_{O(c), C(z)}$$

where $\overline{Yp}(\omega(Td,OA(Amb),t)$ is a load prediction as a function of time t, outdoor/ambient air temperature OA(Amb), and type of day Td; $Y(t|t-1)$ is historical load data; $c(t)$ is an energy tariff (utility rate, price); $\Delta x(t|t-1)$ is historical data for one or more building variables (e.g., temperature, humidity, pressure, air quality); $O(c)$ is an operations cost; and $C(z)$ quantifies comfort of a zone (e.g., estimated and/or predicted occupant comfort as per predicted mean vote or other metric). In such embodiments, step 1202 can include performing an optimization of a function of time-varying conditions, load data, utility rates, and building variables to determine a target energy profile which is optimal relative to a combination or balance of operations cost and zone comfort.

At step 1204, a probability that load shedding will be needed to achieve the target energy profile is determined. Load shedding is a reduction in energy consumption relative to expected energy consumption under normal (standard, typical) operations of a facility. If normal operations are expected to cause energy consumption greater than the target energy profile, then load shedding would be needed to achieve the target energy profile. Due to uncertainty in predictions, an inherently stochastic nature of building loads, etc., step 1204 can use one or more models to determine a probability that load shedding will be needed to achieve the target energy profile, for example a machine learning model such as a Bayesian classifier. The probability that load shedding will occur (P(Ls)) may be a function g of $\overline{Eb}(t)$ and a load prediction for time t+k, $Yp(t+k)$, for example denoted as $P(Ls)=g(\text{Min}|Yp(t+k), \overline{Eb}(t)|_{c(t),O(c)})$. Such a function can be implemented as a trained Bayesian classifier using historical data of load predictions and different scenarios including scenarios where load shedding was implemented and scenarios where load shedding was not implemented, in order to provide training data to support accurate probability calculations. In other embodiments, uncertainties (e.g., confidence intervals, distributions, Gaussian form models) associated with the load predictions and the target energy profile can be used and combined to determine a probability that the load will be higher than the target energy profile without load shedding, i.e., a probability that load shedding is needed to achieve the target energy profile.

At step 1206, if the probability that load shedding is needed to achieve the target energy profile exceeds a threshold (e.g., is greater than 50%, is greater than 75%, is greater than 90%, or other values as may be provided or user-selectable in various embodiments), then a score is generated for each unit of equipment indicating the relative advantage of shedding that unit of equipment (e.g., of turning off that unit of equipment, of changing a setting for that unit of equipment which reduces its energy consumption). Each score can be a probability that the particular unit of equipment will or should be shed. In some embodiments, step 1206 includes executing separate models (e.g., machine learning models) for each of the different units of equipment under consideration for load shedding. In some embodiments, the scores generated in step 1206 are generated using machine learning models or machine learning classification processes trained on historical data for the units of equipment and/or for the building served by the units of equipment.

In some embodiments, the score generated in step 1206 is expressed as a probability that an equipment will be shed, P[Ls(eqp)] where P indicates probability, Ls indicates a load shed, and eqp is a variable indicating the unit of equipment. In some such embodiments, a model or function h for determining the probability P[Ls(eqp)] is provided as:

$$P[Ls(eqp)] =$$
$$h(\text{Min} \mid P(Ls), P(Pc \text{ or } Ph), \Delta x eqp(t \mid t-1), \Delta xi(t \mid t-1), deqp(t \mid t-1),$$
$$di(t \mid t-1), deqp(t+n), \Delta x(t+n) \mid_{C(z), \overline{Eb}(t)})$$

where P(Ls) is the probability that load shedding will be needed (e.g., from step 1204), P(Pc or Ph) is a probability that pre-cooling Pc or pre-heating Ph will be implemented, Δxeqp(t|t−1) is historical data for a first building condition associated with the unit of equipment eqp, Δxi(t|t−1) is historical data for a different, second building condition primarily associated with a different, second unit of equipment i (e.g., a building condition correlated with and/or affected by the first building condition such as a temperature of a neighboring zone), deqp(t|t−1) is historical operating data of the unit of equipment, di(t|t−1) is historical operating data of the different, second unit of equipment i, deqp(t+n) is forecast or planned future operating data of the unit of equipment eqp, and Δx(t+n) is predicted future values of one or more building conditions (e.g., Δxeqp and/or Δxi), $\overline{Eb}(t)$ is the target energy profile from step 1202, and C(z) is a comfort term for the zone for example determined as a function of historical, current, and future values of a building variable (e.g., expressed as C(Δx(t|t−1), Δx(t), Δx(t+n))).

In some embodiments, the function h can be provided as a Bayesian classifier trained via machine learning from historical data, with a different function h (e.g., different Bayesian classifier) trained for each unit of equipment. For example, each Bayesian classifier may take, as inputs, a vector of feature values including values for the variables P(Ls), P(Pc or Ph), Δxeqp(t|t−1), Δxi(t|t−1), deqp(t|t−1), di(t|t−1), deqp(t+n), Δx(t+n) and can be configured as a classifier for selecting between shedding and not shedding the unit of equipment for a corresponding time step or time period. Each Bayesian classifier outputs a numerical value, for example between 0 (e.g., associated with not shedding) and 1 (e.g., associated with shedding). In various embodiments, a thresholder may be applied to convert such numerical values to binary decisions (e.g., values over 0.5 sorted as "shedding," values under 0.5 sorted as "not shedding"), or the numerical value output can be used directly as a probability (e.g., a score, confidence level, etc.) in subsequent steps of process 1200. Because the scores output by the Bayesian classifier are a quantification of a probability of shedding the corresponding equipment, the relative probabilities for different units of equipment can be thought of as reflecting relative confidence levels that the different units of equipment should be shed (e.g., probabilities that it will be beneficial to shed the corresponding units of equipment). Although Bayesian classification is provided as one example of a classification technique which can be used in step 1206, it is contemplated that the classifier in step 1206 can use any of a variety of classification techniques in various embodiments (e.g., logistic regression, Naïve Bayes, K-nearest neighbors, support vector machine, decision tree, binary classification, multi-class classification, multi-label classification, neural network classification, etc.). These and other classification techniques, processes, or procedures which can be used to generate the scores in step 1206 are referred to generally as "machine learning models" or "machine learning classifiers" in the present disclosure.

In some embodiments, the machine learning models or classifiers used in step 1206 can be trained using historical data including historical values of the variables within the vectors of feature values at each of a plurality of historical time steps or time periods. The historical data may include historical data for the units of equipment (e.g., operating data for the equipment) and/or historical data for the building served by the units of equipment (e.g., building conditions of the building). The historical data may further include indications (e.g., labels, classifications, etc.) of whether the unit of equipment shed its load during the historical time step or time period. In various embodiments, the load shedding indications may include binary values (e.g., shedding=yes/no, 1/0, etc.), non-binary values indicating particular amounts of load that were shed (e.g., shedding=X kW), the operating status or state of the unit of equipment (e.g., status=active/inactive, on/off, operating at 20% capacity, 50% capacity, etc.) regardless of whether any load shedding occurred, or other status indications that characterize the operation of the unit of equipment during the historical time step or time period. The machine learning models or classifiers used in step 1206 can be trained to associate or correlate the values of the variables within the vectors of feature values with corresponding load shedding classifications. Accordingly, when new values for the variables within the vectors of feature values (e.g., values for future time steps or time periods) are provided as inputs to the classifiers, the machine learning models classifiers can generate probability scores for the units of equipment indicating which units of equipment would be most likely or most beneficial to shed their load under the conditions indicated by the new values for the variables within the vectors of feature values. The probability scores generated in step 1206 can be understood as relative load shedding priorities indicating a ranking or order in which the units of equipment should be called on to shed their load during the future time period (e.g., shedding the unit of equipment with the highest score first, followed by the unit of equipment with the second highest score, etc. until sufficient load has been shed to achieve the target energy consumption).

At step 1208, load shedding is implemented by shedding the unit of equipment with the highest score from step 1206. Step 1208 can include assessing the scores for the multiple units of equipment, identifying the unit with the highest score (i.e., an extremum of the scores), and controlling the unit of equipment with the highest score to take a load shedding action. Having the highest score indicates that step 1206 has the most confidence that the corresponding unit of equipment should be shed (e.g., a highest probability that it will be beneficial to shed that unit of equipment), such that step 1208 advantageously starts by shedding that unit of equipment. The load shedding action can include turning off the unit of equipment, for example for a period of time for which load shedding is expected to be needed, for a subperiod expected to be sufficient to reach a desired amount of load shedding, etc. The load shedding action can include changing a setpoint or other setting used by the unit of equipment, for example lowering a temperature setpoint for heating equipment, increasing a temperature setpoint for cooling equipment, reducing an ventilation rate setting for ventilation equipment, etc., such that the change in setpoint leads to reduced energy consumption by the unit of equipment as compared to not changing the setpoint. In some embodiments, the load shedding action can include taking a secondary action to at least partially compensate for a load shedding action, for example opening blinds to allow in more natural light if a load shedding action is turning off lights. References here to shedding a unit of equipment encompass implementing any such load shedding action for said unit of equipment.

At step 1210, if further load shedding is needed to achieve the target energy profile, implement the load reduction by shedding the unit of equipment with the next highest score. Step 1210 can include predicting (e.g., determining a probability with respect to) whether the load shedding action taken in step 1208 will be sufficient to achieve the target energy profile (e.g., to reduce energy consumption relative to a baseline/standard amount by enough to reach the target energy profile). In some embodiments, a model for future load prediction as a function of load shedding decisions is used, for example expressed as:

$$\overline{Yfp}(t+k) = f\left(\overline{Yp}(t+k), \omega(Td, OA(Amb), t), OA(Amb), \Delta x(t+n)\right)$$

where $\overline{Yfp}(t+k)$ is a load predicted for time step t+k, $\overline{Yp}(t+k)$ is a load prediction given no load shedding (e.g., under normal operating settings), $\omega(Td,OA(Amb),t)$ is a function of day time, outdoor air temperature, and/or time, OA(Amb) is outdoor air temperature (or other condition of ambient air), and $\Delta x(t+n)$ is a prediction of a building variable at time t+n, with a further input or assumption for $\overline{Yfp}(t+k)$ being that at least some amount of load shedding at step t+k (e.g., load shed implemented in step 1210). The prediction $\overline{Yfp}(t+k)$ can be compared to the target energy profile $\overline{Eb}(t+k)$ (from step 1202) to determine whether sufficient load shedding has been taken to reach the target energy profile (i.e., if $\overline{Yfp}(t+k) \leq \overline{Eb}(t+k)$).

If the prediction in step 1210 predicts that further load reduction is needed to reach the target energy profile, in some embodiments step 1210 includes identifying the unit of equipment with the next highest score (as generated in step 1206) and implementing load shedding for that unit of equipment (e.g., turning off that unit of equipment, changing a setting for that unit of equipment, etc.). The model for future load prediction can then be rerun to determine an updated prediction $\overline{Yfp}(t+k)$, which can be compared to the target energy profile $\overline{Eb}(t+k)$ from step 1202 to determine whether sufficient load shedding has been taken to reach the target energy profile (i.e., if $\overline{Yfp}(t+k) \leq \overline{Eb}(t+k)$). Step 1210 can be repeated iteratively, shedding additional load with each iteration, until a determination is made that sufficient load shedding is being implemented to achieve the target energy profile.

In some embodiments, if more load reduction is needed to reach the target energy profile, a determination can be made as to whether load shifting should be implemented. Load shifting refers to moving load consumption to a different point in time, for example to an off-peak time, which utility prices may be lower or when other advantages exist for equipment operations (e.g., due to outdoor air temperatures which change over a day, etc.). A machine learning model (e.g., Bayesian classifier) can be used, for example to determine a probability of pre-cooling or pre-heating, P (Pc or Ph) according to the following formulation:

$$P(Pc \text{ or } Ph) = P(PL > EB \mid Ls)$$

$$P(PL > Eb \mid Ls) = \frac{P(PL > Eb \cap Ls)}{P(Ls)}$$

$$P(PL > B) = f\left(\overline{Yfp}(t+k), \overline{Eb}(t)\right)$$

$$P(Ls) = g\left(\text{Min} \mid Yp(t+k), c(t) \mid_{\overline{Eb}(t), O(c)}\right)$$

where, as discussed above, P(Ls) is the probability that load shedding will occur, c(t) is an energy tariff (rate, price, etc.), $\overline{Yp}(t+k)$ is predicted load data without a load shed, $\overline{Yfp}(t+k)$ is future predicted load data with a load shedding decision implemented, $\overline{Eb}(t)$ is a target energy profile, O(c) is an operating cost of the equipment, Min indicates optimizing to minimum (e.g., local or global minimum), such that P(PL>Eb|Ls) signifies the probability that predicted load remains greater than the target energy profile in a scenario where load shedding is implemented. If there is a high probability that predicted load remains greater than the target energy profile in a scenario where load shedding is implemented (i.e., P(PL>Eb|Ls) greater than a threshold such as 50%, 75%, etc.), then further steps should be taken to reach the target energy profile. Such further steps can include load shifting, for example by determining setpoints, settings, on/off selections, etc. for equipment that cause equipment operations to move temporally (e.g., from a period with a higher energy tariff to a period with a lower energy tariff). In such embodiments and scenarios, process 1200 can include implementing load shifting in addition to load shedding.

Process 1200 thereby provides for a predictive load shedding of equipment in a manner that intelligently selects which units of equipment serving a facility should be shed in order to achieve an overall target energy consumption for the facility, for example as part of controlling the facility to be a net zero energy facility.

Figure 13:
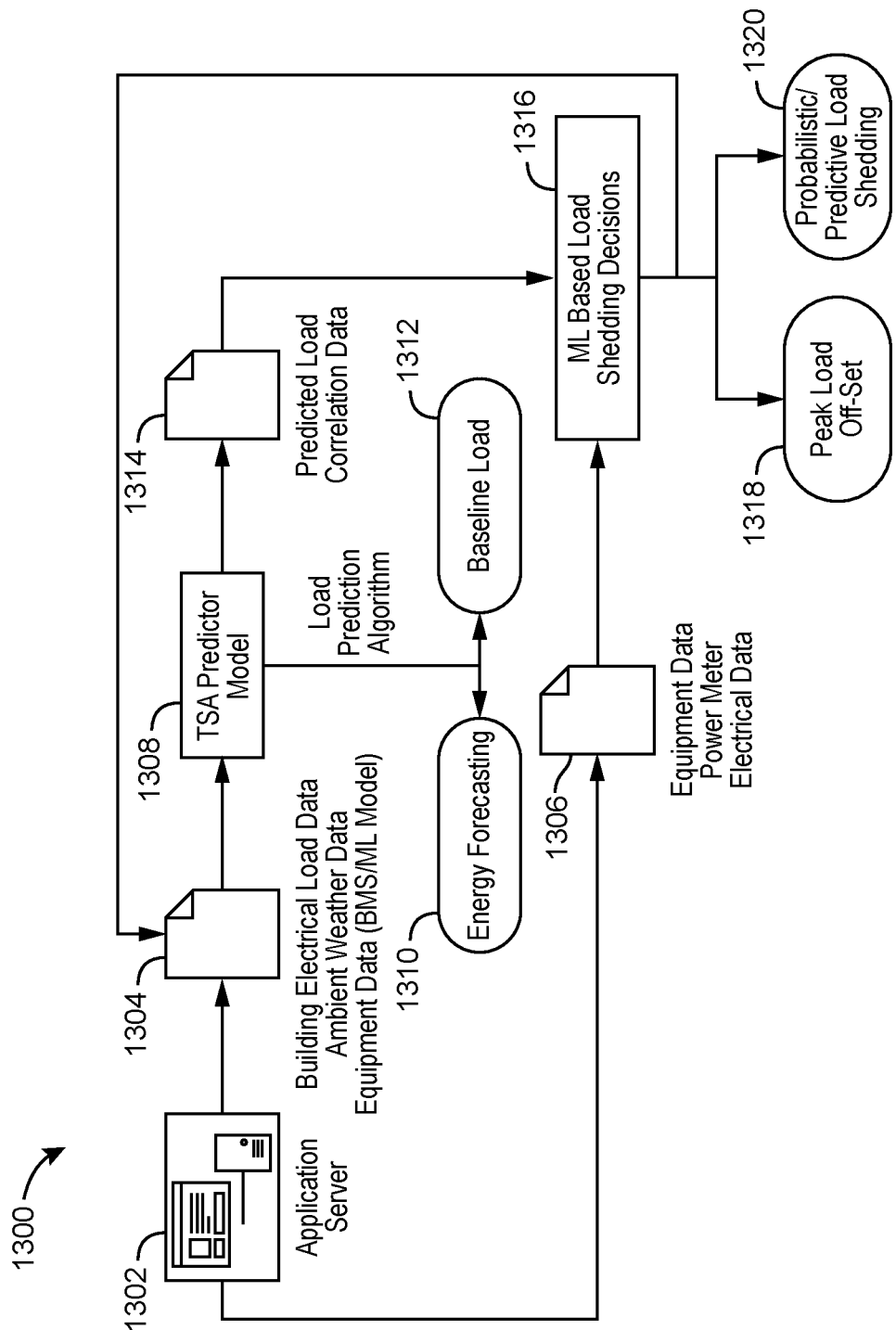
FIG. 13 is a block diagram of an architecture for use with the teachings here, according to some embodiments.

Referring now to FIG. 13, an illustration of an architecture 1300 for implementing one or more processes for load shedding and/or load shifting such as process 1200 is shown, according to some embodiments. The architecture 1300 can be implemented in or using system manager 502, remote systems and applications 444, BMS controller 366, enterprise control applications 426, one or more other systems or devices described herein, or other controllers, circuitry, managers, servers, cloud resources, etc., in various embodiments.

The architecture 1300 is shown as including an application server 1302 (e.g., system manager 502, remote systems and applications 444, etc. in various embodiments) configured to provide (e.g., obtain, store, collect, output, etc.) timeseries data including first timeseries data 1304 (shown as including building electrical load data, ambient weather data, equipment data) and second timeseries data 1306 (shown as including equipment data and power meter electrical data). Equipment data can include equipment models, a digital twin of a facility, and other data relating to units of equipment serving a facility (e.g., equipment types, model numbers, associations with different building spaces, etc.).

The first timeseries data 1304 is shown as an input to a time series predictor model 1308. The time series predictor model 1308 is or provides a load prediction algorithm, for example load prediction models as described above with reference to process 1200. As shown in FIG. 13, the time series predictor model 1308 is configured to output an energy forecast 1310, a baseline load 1312 (e.g., a target energy profile), and predicted load correlation data 1314.

The architecture 1300 is also shown as including a machine learning block 1314. The machine learning block 1314 is configured to provide machine learning models (e.g., Bayesian classifiers), for example a Bayesian classifier associated with each unit of equipment indicated in equipment data in the second timeseries data 1306 received by the machine learning block 1314. The machine learning block is configured to use the second timeseries data 1306 and the predicted load correlation data 1314 to generate load shedding decisions, for example following the teachings of process 1200. As shown in FIG. 13, the machine learning block 1314 outputs a peak load offset 1318 and probabilistic/predictive load shedding decisions 1320.

FIG. 13 also illustrates that an output of the machine learning block 1316 can be included in the first timeseries data 1304, for example so that a peak load offset 1318 and/or probabilistic/predictive load shedding decisions 1320 are included in the first timeseries data 1304 as inputs to the time series predictor model 1308. This can enable load predictions which account for scenarios where load shedding is implemented, for example as described above with reference to process 1200. The architecture 1300 can thus enable iterative execution of predictions and decision making in order to implement load shedding in a manner that intelligently achieves energy consumption objectives.

Figure 14:
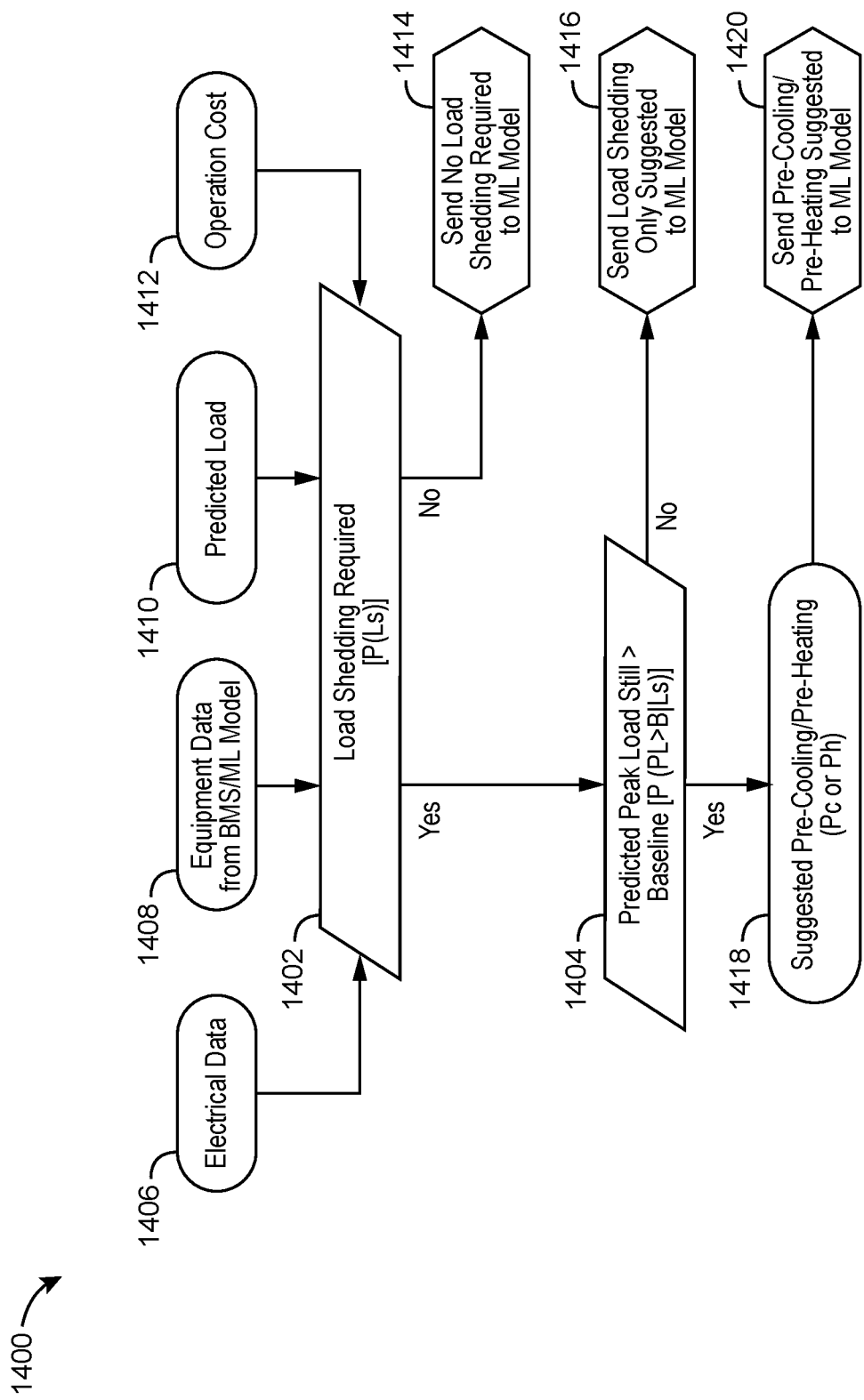
FIG. 14 is a flowchart of a process for load shedding, according to some embodiments.

Referring now to FIG. 14, a flowchart of a process 1400 is shown, according to some embodiments. The process 1400 can be can be executed by the system manager 502, the BMS controller 366, one or more other systems or devices described herein, and/or other controller, circuitry, computing resource, etc. in various embodiments. For example, one or more computer-readable media can store instructions executable to cause one or more processors to perform the operations of process 1400 described herein. Process 1400 can be provided in coordination with (e.g., as part of, in combination with, etc.) process 1200 in various embodiments.

As shown in FIG. 14, process 1400 includes a first decision block 1402 and a second decision block 1404. The first decision block 1402 determine whether load shedding is required, for example by determining whether a probability that load shedding will be needed to achieve a target energy consumption exceeds a threshold (e.g., as described for step 1204 of FIG. 12). As shown in FIG. 14, inputs to the first decision block 1402 include electrical data 1406, equipment data from a BMS and/or machine learning model 1408, predicted load data 1410, and operating cost data 1412. At the first decision block 1402, process 1400 determines, based on such input data, whether load shedding is required.

If load shedding is determined as not being required ("No" from the first decision block 1402), process 1400 proceeds from the first decision block 1402 to step 1414 where a decision that no load shedding is required is output. Step 1414 can include operating equipment according to a normal (standard, baseline, etc.) setpoint, control mode, etc. (i.e., without implementing load shedding). Step 1414 can also include providing the no-load-shedding decision to a machine learning model or other predictive model for use in training, reiterating model parameters, making other decisions or forecasts, or the like.

If load shedding is determined as being required ("Yes" from the first decision block 1404), process 1400 proceeds to the second decision block 1404. At the second decision block 1404, a determination is made as to whether, with load shedding implemented, a predicted peak load is still expected to be greater than a baseline (e.g., greater than a target peak load). Such a determination can be made using a probability-based approach as described for step 1210 of process 1200, for example. Like the first decision block 1404, the second decision block 1404 can also utilize the electrical data 1406, the equipment data 1408, load predictions 1410, and operating costs 1412.

If predicted peak load is not still expected to be greater than a baseline ("No" from the second decision block 1404), process 1400 proceeds to step 1416, where a determination to provide load shedding only (i.e., load shedding without load shifting) is implemented. Step 1416 can include controlling equipment to provide load shedding. As shown, step 1416 can include providing a suggestion (recommendation, instruction, command, decision, etc.) for load-shedding-only to a machine learning model or other model or process for determining how to implement such load shedding.

If predicted peak load is still expected to be greater than the baseline ("Yes" from the second decision block 1406), process 1400 proceeds to step 1418 where a suggestion for pre-cooling or pre-heating (or other load shifting) is generated. The pre-heating, pre-cooling, or other load shifting suggestion can be generated based on a remaining amount of load to be reduced to reach the target or baseline, as well as any of the other inputs to process 1400 (e.g., electrical data 1406, equipment data 1408, predicted load 1410, operating costs 1412). For example, step 1418 can include selecting between pre-heating or pre-cooling based on a weather forecast (e.g., pre-cooling on a hot day, pre-heating on a cold day). As another example, a load-shifting suggestion in step 1418 can be based on an occupancy schedule or prediction.

At step 1420, the load-shifting suggestion (e.g., request, command, recommendation, instruction) can be implemented, for example by providing the load-shifting suggestion to a model (e.g., machine learning model) that takes the load-shifting suggestion and determines setpoints or other settings, control decisions, etc. to implement the suggested load-shifting. For example, step 1420 can include providing pre-cooling by reducing a temperature setpoint for a time period before a peak period (e.g., in the morning for one or more hours before a business day starts) or providing pre-heating by increasing a temperature setpoint for a time period before a peak period, and then controlling equipment in accordance with those setpoints. Process 1400 thereby implements load shedding and, in some scenarios, load shifting when determined to be appropriate to reach a target peak load.

Figure 15:
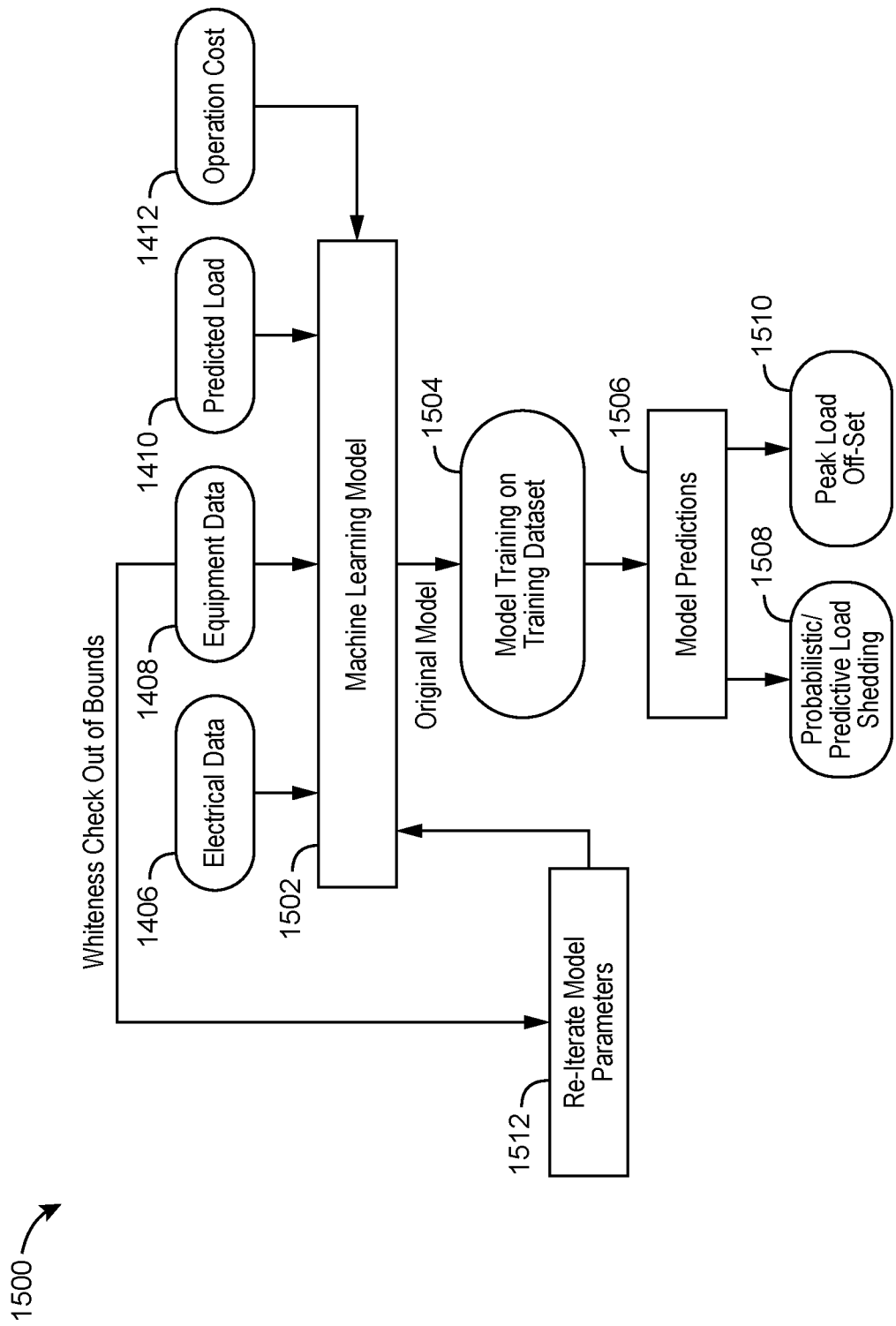
FIG. 15 is a flowchart of another process, according to some embodiments.

Referring now to FIG. 15, a process 1500 is shown, according to some embodiments. The process 1500 can be can be executed by the system manager 502, the BMS controller 366, one or more other systems or devices described herein, and/or other controller, circuitry, computing resource, etc. in various embodiments. For example, one or more computer-readable media can store instructions executable to cause one or more processors to perform the operations of process 1500 described herein. Process 1500 can be provided in coordination with (e.g., as part of, in combination with, etc.) process 1200 and/or process 1400 in various embodiments.

As shown in FIG. 15, process 1500 includes providing a machine learning model 1502. The machine learning model 1502 is shown as receiving the inputs used in process 1400, shown as electrical data 1406, equipment data 1408, predicted load data 1410, and operating cost data 1412. In process 1500, the machine learning model 1502 is first subjected to model training 1504 based on a training dataset, for example a set of the electrical data 1406, equipment data 1408, predicted load data 1410, and operating cost data 1412 for a historical time period. In some embodiments, the training data includes simulated data and/or data generated by running experiments to generate a rich set of training data (e.g., by controlling equipment through a range of possible conditions, settings, etc.). Model training 1504 can include various machine learning techniques in various embodiments, for example various supervised or unsupervised machine learning techniques.

After model training 1504, the machine learning model 1502 can be used to generate model predictions 1506. In the step of model predictions 1506, the machine learning model 1504 can take inputs of electrical data 1406, equipment data 1408, predicted load data 1410, and operating cost data 1412 for around a current time (e.g., including a preceding several time steps and/or predictions/forecasts for upcoming time steps) and output predictions, for example predictions which are probabilities of whether load shedding and/or load shedding should be implemented as discussed above with reference processes 1200 and 1400 and/or other load off-set information. These outputs are illustrated in FIG. 15 by probabilistic/predictive load shedding 1508 and peak load off-set 1510. Process 1500 can include controlling equipment to implement/achieve the probabilistic/predictive load shedding 1508 and peak load off-set 1510.

Process 1500 is also shown as including model parameter reiteration 1512. Over time, actual equipment and building behavior (performance, characteristics, etc.) may drift from the behavior reflected in training data used in model training 1504. Accordingly, periodically retuning, updating, etc. model parameters in model parameter reiteration 1512 can ensure that the machine learning model 1502 continues indefinitely (e.g., substantially forever if the processes herein continue to be executed) to provide reliable outputs and good decisions for probabilistic/predictive load shedding 1508 and peak load offset 1510.

Figure 16:
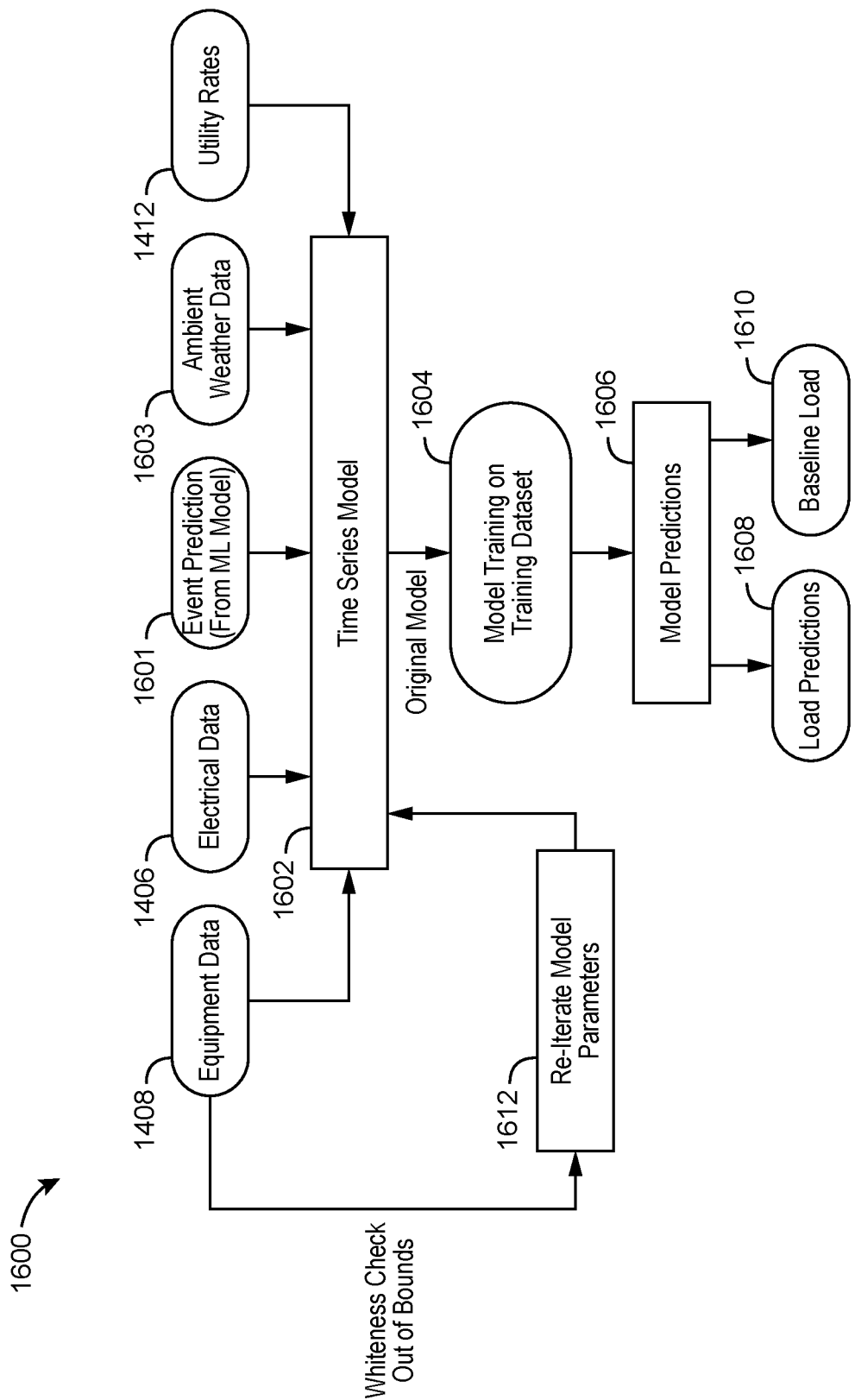
FIG. 16 is a flowchart of another process, according to some embodiments.

Referring now to FIG. 16, a process 1600 is shown, according to some embodiments. The process 1600 can be can be executed by the system manager 502, the BMS controller 366, one or more other systems or devices described herein, and/or other controller, circuitry, computing resource, etc. in various embodiments. For example, one or more computer-readable media can store instructions executable to cause one or more processors to perform the operations of process 1560 described herein. Process 1500 can be provided in coordination with (e.g., as part of, in combination with, etc.) processes 1200, 1400 and/or 1500 in various embodiments.

As shown in FIG. 16, process 1600 includes providing a time series model 1602. The time series model 1602 is shown as receiving similar inputs as for processes 1400 and 15000, shown as electrical data 1406, equipment data 1408, and operating cost (e.g., utility rate) data 1412. The time series model 1602 is also shown as receiving event predictions 1601 from the machine learning model 1504 (i.e., instances of probabilistic/predictive load shedding 1508 and/or peak load off-set 1510) and ambient weather data 1603. In process 1600, the time series model 1602 is first subjected to model training 1604 based on a training dataset, for example a set of the electrical data 1406, equipment data 1408, operating cost data 1412, event predictions 1601 and ambient weather data 1603 for a historical time period. In some embodiments, the training data includes simulated data and/or data generated by running experiments to generate a rich set of training data (e.g., by controlling equipment through a range of possible conditions, settings, etc.). Model training 1604 can include various machine learning techniques in various embodiments, for example various supervised or unsupervised machine learning techniques, regression modeling techniques, or other techniques suitable for training predictive timeseries models.

After model training 1604, the time series model 1602 can be used to generate model predictions 1606. In the step of model predictions 1606, the time series model 1602 can take inputs of the electrical data 1406, equipment data 1408, operating cost data 1412, event predictions 1601 and ambient weather data 1603 for around a current time (e.g., including a preceding several time steps and/or predictions/forecasts for upcoming time steps) and output predictions, for example load predictions 1608 and a baseline load (e.g., target energy profile) 1610.

Process 1600 is also shown as including model parameter reiteration 1612. Over time, actual equipment and building behavior (performance, characteristics, etc.) may drift from the behavior reflected in training data used in model training 1604. Accordingly, periodically retuning, updating, etc. model parameters in model parameter reiteration 1612 can ensure that the time series model 1602 continues indefinitely (e.g., substantially forever if the processes herein continue to be executed) to provide reliable outputs, i.e., values for load predictions 1608 and a baseline load 1610.

In some embodiments, the load predictions 1608 and/or baseline load 1610 are used as inputs to the machine learning model 1502 (i.e., as predicted loads 1410). In this regard, the time series model 1602 and the machine learning model 1502 (and processes 1600 and 1500) are used iteratively, recursively, repeatedly, in a loop, etc. so that outputs of the time series model 1602 are used as inputs to the machine learning model 1502 and outputs of the machine learning model 1502 are used as inputs to the time series model 1602. In this manner an intelligent, predictive system is structured which can be used to implement process 1200 or other teachings herein.

CONFIGURATION OF EXAMPLE EMBODIMENTS

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the embodiments without departing from the scope of the present disclosure.

What is claimed is:

1. A method for controlling building equipment to achieve a target energy consumption, comprising:
   determining a probability that load shedding will be needed to achieve the target energy consumption during a future time period;
   in response to the probability exceeding a threshold, generating a plurality of scores for a plurality of units of equipment using one or more machine learning models trained on historical data from a historical time period, the plurality of scores indicating relative load shedding priorities associated with the plurality of units of the equipment during the future time period; and
   implementing the load shedding by controlling the plurality of units of equipment in accordance with the plurality of scores during the future time period, wherein controlling the plurality of units of equipment comprises shedding a first unit of the plurality of units, the first unit associated with an extremum score of the plurality of scores.

2. The method of claim 1, further comprising shedding a second unit of the plurality of units in response to determining that shedding the first unit is insufficient to achieve the target energy consumption.

3. The method of claim 1, wherein shedding the first unit comprises turning off the first unit.

4. The method of claim 1, wherein shedding the first unit comprises changing a setting for the first unit.

5. The method of claim 1, wherein generating the plurality of scores comprises using a plurality of machine learning models associated with the plurality of units of the equipment.

6. The method of claim 5, wherein:
   the plurality of machine learning models comprise a first machine learning model for the first unit of the plurality of units;
   using the plurality of machine learning models comprises providing, as inputs to the first machine learning model, a first value of a first building condition associated with the first unit and a second value of a second building condition associated with a second unit of the plurality of units; and
   the first building condition is correlated with the second building condition.

7. The method of claim 1, further comprising controlling the equipment to provide load shifting in response to predicting that the load shedding is insufficient to achieve the target energy consumption.

8. The method of claim 1, wherein the target energy consumption comprises a plurality of energy amounts associated with a plurality of time steps in a time period.

9. The method of claim 1, further comprising generating the target energy consumption based on a net energy goal and a forecast amount of energy generation.

10. The method of claim 9, further comprising generating the net energy goal as an output of a control process configured to drive cumulative net energy over a time period to a value of zero or higher, wherein the net energy goal is for a subperiod of the time period.

11. One or more non-transitory computer-readable media storing program instructions that, when executed by one or more processors, cause the one or more processors to perform operations comprising:
   determining a probability that load shedding will be needed during a future time period to achieve a target energy consumption during the future time period;
   in response to the probability exceeding a threshold, generating a plurality of scores for a plurality of units of equipment using one or more machine learning models trained on historical data from a historical time period, the plurality of scores indicating relative load shedding priorities associated with the plurality of units of the equipment during the future time period; and
   implementing the load shedding by controlling the plurality of units of equipment during the future time period in accordance with the plurality of scores, wherein controlling the plurality of units of equipment comprises shedding a first unit of the plurality of units, the first unit associated with an extremum score of the plurality of scores.

12. The one or more non-transitory computer-readable media of claim 11, the operations further comprising shedding a second unit of the plurality of units in response to determining that shedding the first unit is insufficient to achieve the target energy consumption.

13. The one or more non-transitory computer-readable media of claim 11, wherein shedding the first unit comprises turning off the first unit or changing a setting for the first unit.

14. The one or more non-transitory computer-readable media of claim 11, wherein generating the plurality of scores comprises using a plurality of machine learning models associated with the plurality of units of the equipment.

15. The one or more non-transitory computer-readable media of claim 14, wherein:
   the plurality of machine learning models comprise a first machine learning model for the first unit of the plurality of units;
   using the plurality of machine learning models comprises providing, as inputs to the first machine learning model, a first value of a first building condition associated with the first unit and a second value of a second building condition associated with a second unit of the plurality of units; and
   the first building condition is correlated with the second building condition.

16. The one or more non-transitory computer-readable media of claim 11, the operations further comprising controlling the equipment to provide load shifting in response to predicting that the load shedding is insufficient to achieve the target energy consumption.

17. The one or more non-transitory computer-readable media of claim 11, wherein the target energy consumption comprises a plurality of energy amounts associated with a plurality of time steps in a time period.

18. The one or more non-transitory computer-readable media of claim 11, the operations further comprising generating the target energy consumption based on a net energy goal and a forecast amount of energy generation.

19. The one or more non-transitory computer-readable media of claim 18, the operations further comprising generating the net energy goal as an output of a control process configured to drive cumulative net energy over a time period to a value of zero or higher, wherein the net energy goal is for a subperiod of the time period.

20. A system, comprising:
   a plurality of units of building equipment serving a facility;
   a controller programmed to:

determine a probability that load shedding will be needed to achieve a target energy consumption for the facility;

in response to the probability exceeding a threshold, generate a plurality of scores for the plurality of units of equipment indicating relative advantages of load shedding priorities associated with the plurality of units of the equipment; and implementing the load shedding by shedding a first unit of the plurality of units in response to the first unit being associated with a maximum score of the plurality of scores.

* * * * *